US012084087B2

(12) United States Patent
Garimella et al.

(10) Patent No.: US 12,084,087 B2
(45) Date of Patent: Sep. 10, 2024

(54) FOCUSING PREDICTION DISTRIBUTION OUTPUT FOR EFFICIENT SAMPLING

(71) Applicant: Zoox, Inc., Foster City, CA (US)

(72) Inventors: Gowtham Garimella, Dublin, CA (US); Marin Kobilarov, Baltimore, MD (US); Andres Guillermo Morales Morales, San Francisco, CA (US); Ethan Miller Pronovost, San Mateo, CA (US); Kai Zhenyu Wang, Foster City, CA (US); Xiaosi Zeng, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 14 days.

(21) Appl. No.: 17/535,418

(22) Filed: Nov. 24, 2021

(65) Prior Publication Data

US 2023/0159060 A1 May 25, 2023

(51) Int. Cl.
*B60W 60/00* (2020.01)
*G06N 3/02* (2006.01)

(52) U.S. Cl.
CPC .......... *B60W 60/0027* (2020.02); *G06N 3/02* (2013.01); *B60W 2554/402* (2020.02);
(Continued)

(58) Field of Classification Search
CPC ............... B60W 30/08; B60W 30/095; B60W 30/0953; B60W 30/0956; B60W 2050/0002; B60W 50/0097; B60W 60/0027; B60W 60/00272; B60W 60/00274; B60W 60/00276; B60W 60/001; B60W 2554/40; B60W 2554/402; B60W 2554/404; B60W 2554/4041; B60W 2554/4042; B60W 2554/4043; B60W 2554/4044; B60W 2554/4045;
(Continued)

(56) References Cited

U.S. PATENT DOCUMENTS

2019/0072966 A1 3/2019 Zhang
2019/0122037 A1* 4/2019 Russell ................ G06V 40/103
(Continued)

OTHER PUBLICATIONS

Rhinehart, Nicholas et al., "PRECOG: PREdiction Conditioned on Goals in Visual Mulit-Agent Settings", 24 pages.
(Continued)

*Primary Examiner* — Russell Frejd
*Assistant Examiner* — Brandon Z Willis
(74) *Attorney, Agent, or Firm* — Lee & Hayes, P.C.

(57) ABSTRACT

Techniques for determining unified futures of objects in an environment are discussed herein. Techniques may include determining a first feature associated with an object in an environment and a second feature associated with the environment and based on a position of the object in the environment, updating a graph neural network (GNN) to encode the first feature and second feature into a graph node representing the object and encode relative positions of additional objects in the environment into one or more edges attached to the node. The GNN may be decoded to determine a distribution of predicted positions for the object in the future that meet a criterion, allowing for more efficient sampling. A predicted position of the object in the future may be determined by sampling from the distribution.

20 Claims, 14 Drawing Sheets

(52) U.S. Cl.
CPC ............... *B60W 2554/4041* (2020.02); *B60W 2554/4042* (2020.02); *B60W 2554/4043* (2020.02); *B60W 2554/4045* (2020.02); *B60W 2554/4046* (2020.02); *B60W 2555/60* (2020.02); *B60W 2556/40* (2020.02)

(58) Field of Classification Search
CPC ..... B60W 2554/4046; B60W 2555/60; B60W 2556/40; G06N 3/02
See application file for complete search history.

(56) References Cited

U.S. PATENT DOCUMENTS

| | | | |
|---|---|---|---|
| 2019/0122307 A1 | 4/2019 | Sayed | |
| 2020/0207339 A1 | 7/2020 | Neil et al. | |
| 2020/0324794 A1* | 10/2020 | Ma | B60W 60/00272 |
| 2020/0379461 A1 | 12/2020 | Singh et al. | |
| 2021/0009119 A1 | 1/2021 | Nattermann et al. | |
| 2021/0009163 A1* | 1/2021 | Urtasun | G08G 1/0112 |
| 2021/0197895 A1 | 7/2021 | Valchok | |
| 2022/0135086 A1* | 5/2022 | Mahjourian | B60W 60/00272 701/23 |
| 2022/0266822 A1 | 8/2022 | Nardi et al. | |
| 2022/0308581 A1* | 9/2022 | Ma | G06N 3/088 |
| 2023/0159027 A1 | 5/2023 | Pronovost | |
| 2023/0159059 A1 | 5/2023 | Garimella | |
| 2023/0162470 A1 | 5/2023 | Garimella | |

OTHER PUBLICATIONS

Salzmann, Tim, et al., "Trajectron ++: Dynamically-Feasible Trajectory Forecasting With Heterogeneous Data", Autonomous Systems Lab, Stanford University, Jan. 13, 2021, 23 pages.

Tang, Yichuan Charlie, et al., "Multiple Futures Prediction", 33rd Conference of Neural Information Processing Systems, Vancouver, Canada, Dec. 6, 2019, 17 pages.

PCT Search Report and Written Opinion dated Feb. 21, 2023 for PCT application No. PCT/US2022/047451, 11 pages.

Office Action for U.S. Appl. No. 17/535,382, dated Aug. 10, 2023, Ethan Miller Pronovost, "Boundary Aware Top-Down Prediction", 33 pages.

Office Action for U.S. Appl. No. 17/535,357, mailed on Dec. 28, 2023, Gowtham Garimella, "Encoding Relative Object Information Into Node Edge Features", 19 pages.

Office Action for U.S. Appl. No. 17/535,396, mailed on Jan. 19, 2024, Garimella, "Prediction Sampling Techniques", 26 Pages.

* cited by examiner

FOCUSING PREDICTION DISTRIBUTION OUTPUT FOR EFFICIENT SAMPLING

BACKGROUND

Autonomous vehicles may include various software-based systems, hardware-based systems, and/or controllers to guide the vehicle through an environment. For example, a controller of an autonomous vehicle can use sensor systems, object perception and prediction systems, and route planning and optimization techniques to plan routes, determine drive paths, and guide the vehicle through environments containing static and dynamic objects. In order to ensure safety for passengers as well as surrounding persons and objects, while traversing through congested areas with other moving vehicles (autonomous or otherwise), moving people, stationary buildings, etc., the autonomous vehicle may receive and analyze data to make decisions. For instance, while traversing an environment, the autonomous vehicle may use a combination of sensor data from various sensors about the objects in the surrounding environment, as well map data representing the surrounding environment, to analyze the environment and determine how to control and navigate the vehicle in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
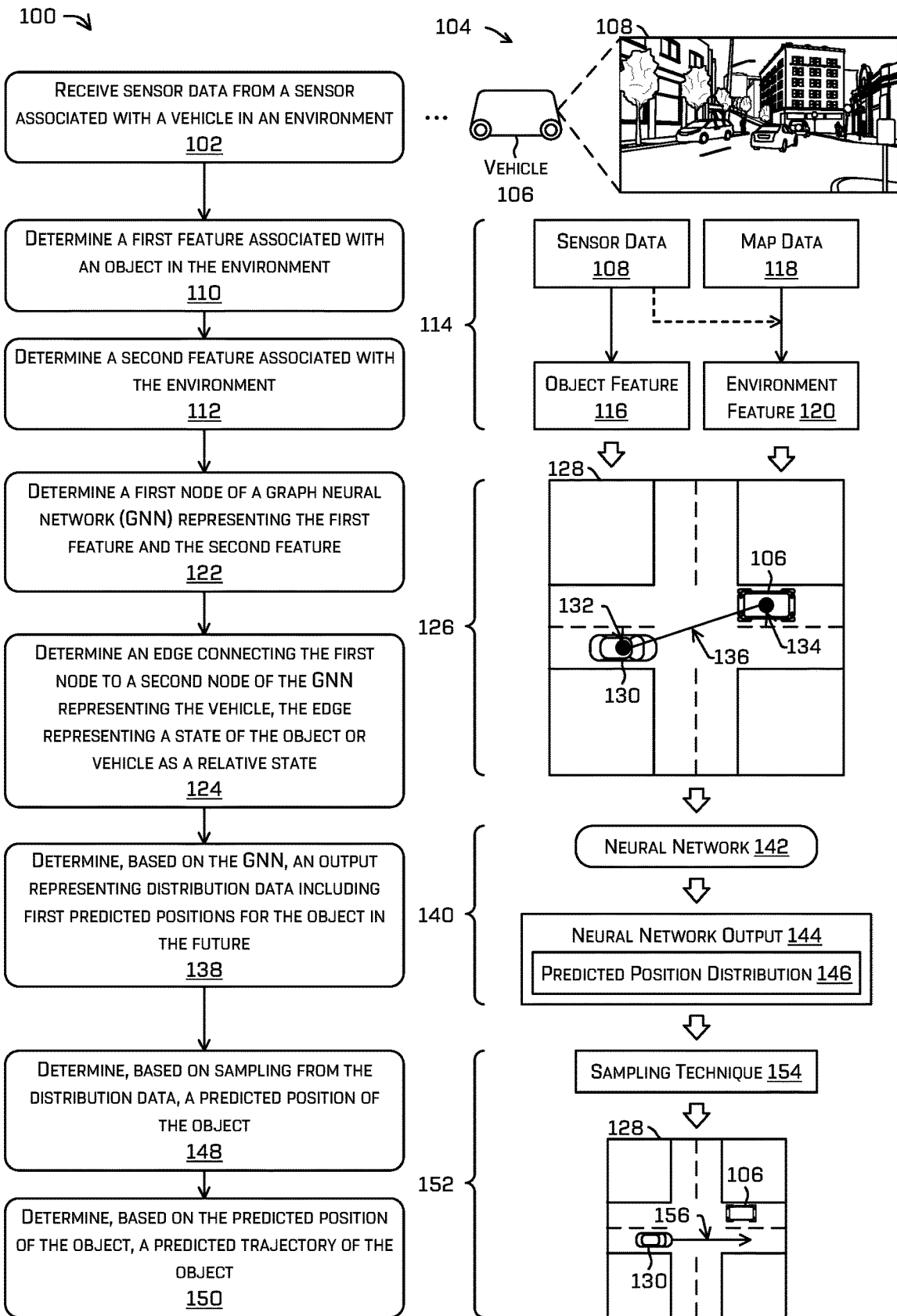
FIG. 1 is a pictorial flow diagram of an example process for capturing sensor data, encoding features into a node and an edge of a graph neural network (GNN), and sampling a predicted position of an object from distribution data output by the GNN.

Techniques for determining predicted future locations of objects in an environment are discussed herein. For example, the techniques described herein may include predictions and planning operations based on analyses of sensor data, map data, and/or objects determined in an environment. In some examples, the techniques may include determining and vectorizing elements of an environment from a feature map associated with the environment, as well as objects (also referred to herein as entities, agents, etc.) perceived in the environment, and representing the vectorized environment elements and objects within a graph structure. In some examples, a computing device in a vehicle, such as an autonomous vehicle, and/or associated with a vehicle, may generate and use a graph neural network (GNN) that includes a combination of vehicle nodes and/or object nodes. The GNN also may include an edge network storing offset data (e.g., relative positions, relative poses, relative speeds, relative accelerations, relative sizes, etc.) between pairs of objects in the GNN. A GNN is a type of neural network which may operate on a graph structure. In various implementations, the GNN may be partially connected or fully connected with separate edge features associated with distinct pairs of nodes in the GNN. Machine-learning based inference operations, such as, for example, graph message passing, may be performed to update the state of the GNN, including updating nodes and/or edge features, based on internal inputs determined from the GNN itself and/or based on updated observations perceived by the autonomous vehicle in the environment. Updates to the GNN (also referred to as data output by the GNN) may represent a distribution of predicted future states of individual objects in the environment, and the autonomous vehicle may decode portions of the GNN and/or sample from the distribution output to determine predictions for object positions, velocities, trajectories, and/or other updated predicted states for the objects in the environment.

As discussed herein, sensor data may be captured by a sensor associated with a vehicle in an environment. In some examples, the environment may include one or more objects, such as, for example, a first object (e.g., an entity). The sensor data may be processed in various ways to determine features associated with the vehicle, the first object, and/or the environment. For example, first data may be determined representing a first state of the first object. In some examples, the first state may include, but is not limited to, a pose of the object, a position of the object, an acceleration of the object, a speed of the object, a size of the object, a type of the object, a lighting state of the object, and the like. In some examples, the first data representing the first state of the first object may be input into a first machine learned (ML) model and processed to determine output data, such as, for example, second data including a first feature associated with the first object. The first ML model may be configured as a recurrent neural network (RNN). In some examples, the second data may be configured as multi-dimensional data and may include any number of channels corresponding to the number of features associated with the object.

Additionally, or alternatively, map data associated with the environment, or a portion thereof in which the vehicle is traversing, may be determined and/or received. In some examples, the sensor data and/or map data may be processed to determine third data representing a view of the environment. In some examples, the third data may be represented in a plan view or top-down view. In other instances, the third data may be represented in an elevation view or a side view. In some examples, the view of the environment may represent various elements within the environment of the vehicle, including but not limited to roads, lanes, curbs, shoulders, crosswalks, buildings, trees, medians, street signs, traffic signals, speed limits, etc. In some examples, the third data representing the view of the environment may be input into a second ML model and processed to determine output data, such as, for example, fourth data including a second feature associated with the environment. The second ML model may be configured as an RNN or a convolution neural network (CNN). In some examples, the fourth data may be configured as multi-dimensional data and may include any number of channels corresponding to the number of features associated with the environment. Additionally, or alternatively, the sensor data and/or map data may be processed to determine a feature map representing an area associated with an environment, and the second feature may be determined based on a current position of the first object in the environment and a corresponding position on the feature map, where the second feature may be extracted from the feature map at the current position of the object, providing scene context features relative to the position of the object.

With the first feature associated with the object and the second feature associated with the environment determined, the GNN may be generated and/or updated. In some examples, the GNN may be generated by determining a graph node representing the first object using the first feature and the second feature. Additionally, or alternatively, the GNN may be updated by associating the first feature and the second feature with a graph node representing the first object. Additionally, or alternatively, a second graph node of the GNN representing the vehicle may be determined and/or updated. Once two or more graph nodes of the GNN have been determined and/or updated, an edge connecting the first node and the second node may be determined. In some examples, an edge connecting two graph nodes may be encoded with features associated with objects represented by the nodes relative to one another. For example, a first edge may be determined connecting the first graph node associated with the first object and the second graph node associated with the vehicle. The first edge may be encoded with features associated with the first object (e.g., the first and second feature) relative to the vehicle, and/or features associated with the vehicle relative to the first object.

As previously described, a predicted position associated with a graph node of the GNN and/or distribution data associated with a graph node of the GNN may be determined based on updating the GNN and/or performing an inference operation on the GNN. The distribution data may include a distribution of predicted positions for an object in the future (e.g., at variable time increments). In some examples, the GNN may output a single Gaussian distribution per object in the environment. The GNN may be configured such that predicted positions included in the distribution data for an object may be determined based on features associated with the object (e.g., the first and second features) and may be relative to other objects in the environment, that is, first predicted positions for a first object may be configured such that they do not overlap, or otherwise collide, with second predicted positions for a second object at the same timestep.

A predicted position of an object in the future (e.g., from one timestep to the next) may be determined in various ways. In some examples, a predicted position of an object may be determined by sampling from the distribution data according to a sampling technique, such as, for example, gaussian sampling (e.g., following a sampling pattern based on a gaussian distribution), most likely sampling (e.g., taking an average, such as the min, max, or mean of the distribution), or overwrite sampling (e.g., selecting a specific position for an object that may or may not be included in the distribution). For example, a first predicted position of the first object may be determined by sampling from the first distribution data output by the GNN.

Once a predicted position of an object has been determined (e.g., a predicted position at timestep 1), additional predicted positions in the future may be determined (e.g., a predicted position at timestep 2) from the predicted position and/or a trajectory of the object may be determined based on the predicted position. For example, with the first predicted position determined, the first graph node representing the first object may be updated to reflect first feature(s) associated with the object at the first predicted position and/or second feature(s) associated with the environment at the first predicted position. Accordingly, second distribution data, including second predicted positions for the object (at timestep 2, for example), may be output by the GNN following the updating of the graph node or an inference operation. Since the first predicted position of the object is reflected by the updated graph node, the second distribution data may include second predicted positions from the first predicted position. The second distribution data may then be sampled to determine a second predicted position of the object. This process may be repeated any number of times to determine a number of predicted positions of an object at incremental timesteps (e.g., 0.1 seconds, 0.5 second, 1 second, 2 seconds, etc.) out to any time in the future (e.g., 1 second, 2 seconds, 4 seconds, 8 seconds, etc.).

The predicted positions of an object may be utilized to determine a predicted trajectory of the object. For example, a predicted trajectory of the first object may be determined based on the starting position (also referred to as current position) of the first object (at timestep 0), the first predicted position of the first object (at timestep 1), and the second predicted position of the first object (at timestep 2). The predicted trajectory may be configured to follow along the predicted positions for the object as the timesteps increment.

Additionally, while only described with respect to a single object in the environment, the techniques described herein may be performed in parallel (e.g., on a parallel processing device such as a graphics processing unit (GPU)), such that distribution data may be output for each object in the environment at a single timestep and include predicted positions of the object at the next timestep relative to the other predicted positions of the other objects in the environment. This allows for N sets of futures to be determined for an environment over a period of time, where N may be any integer greater than 0 and each future may include a single possible trajectory (e.g., a trajectory that does not overlap with another and/or result in collision between objects) for each object in the environment.

Additionally, or alternatively, the distribution data may be evaluated to determine focused distribution data including a subset of predicted positions that meet a criterion, allowing for more efficient sampling of the predicted positions (e.g., removing impossible real-world scenarios, influencing an object to behave in a specific manner, etc.). In some examples, the criterion may be based on a type of an object, a characteristic of an object, map data, input data, or the like. In some examples, the distribution data may include one or more predicted positions of an object that may not reflect real world operation of the object. For example, one or more predicted positions of the distribution data may not conform to rules of the road (which may be reflected by map data and/or input data), such as, for example, stop signs, traffic lights, speed limits, construction zones, and the like. Additionally, or alternatively, it may be desirable to evaluate an object acting in an adversarial manner (e.g., driving recklessly, turning from an improper lane, performing a sudden stop, etc.). In some examples, the distribution data may include a limited number of predicted positions that reflect the object acting in an adversarial manner, such that using traditional random sampling techniques may rarely result in selection of such predicted positions. By evaluating the distribution data with respect to a criterion (e.g., enforcing one or more rules of the road, performing in an adversarial manner, etc.), a subset of the distribution data may be determined including only predicted positions that meet the criterion.

Additionally, or alternatively, the distribution data may be sampled using various sampling techniques. In some examples, a sampling technique for sampling a distribution set may be determined based on a classification type of a graph node (e.g., is the graph node associated with the vehicle, an object, a specific type of object, etc.), the predicted positions of the distribution data (e.g., whether the predicted positions are in a predefined area), a distribution type of the distribution data, an input associated with the distribution data (e.g., a reference trajectory associated with an object), or the like. In some examples, different sampling techniques may be employed on the same object at different timesteps. For example, a first predicted position for an object may be determined at a first time using a gaussian sampling technique, and a second predicted position for the object may be determined at a second time using a sampling technique configured to maximize progress of the object at the second time. Additionally, or alternatively, different sampling techniques may be employed on different objects at the same timestep. For example, a first predicted position for a first object may be determined at a first time using a first sampling technique configured to minimize progress of the first object at the first time, and a second predicted position for a second object may be determined at the first time using a second sampling technique configured to maximize the progress of the second object at the first time. Additionally, or alternatively, different sampling techniques may be employed to overwrite distribution data output for a specified object of multiple objects. For example, a distribution output for an object may include predicted positions of the object, and an input may be received to configure the sampling technique to determine a predicted position of the object that follows a reference trajectory.

Additionally, or alternatively, the distribution data may be further evaluated to determine whether distribution data should be overwritten. Take, for example, an area of the environment that includes the vehicle and the first object (e.g., a fixed area surrounding the vehicle capturing the sensor data). In some examples, the area may be configured as a top-down scene associated with the vehicle and generated based on the sensor data. Additionally, or alternatively, the area of the environment may be limited by a specified distance, a trajectory and/or speed associated with the vehicle, an area in which the sensors are able to capture sensor data and determine environmental features, and the like. In some examples, the distribution data for the first object may be evaluated to determine whether the predicted positions of the first object, or a threshold number of the predicted positions, are outside of the area or inside of the area.

When the first object exits the area of the environment, the graph node may be updated, representing the second feature associated with the environment with null scene context data. As such, the GNN may output distribution data based on the feature(s) associated with the object and the null scene context features associated with the environment, resulting in predicted positions of the object that may not consider features of the environment. Take, for example, a road on which the object is traveling having a turn or a curve. In some examples, distribution data of the object outside of the area may include predicted positions that do not follow the curvature of the road, and iteratively predicting the positions in such a scenario may result in an unrealistic predicted trajectory of the object off of the road. Accordingly, it may be beneficial to utilize map data associated with the environment in lieu of the feature(s) associated with the environment to determine predicted positions of an object outside of the area of the environment.

For example, it may be desirable to determine predicted positions of an object outside of a bounded area of an environment (e.g., when scene context is null) that conform to the environment outside of the bounded area. In some examples, map data associated with the environment may be utilized to project a first predicted position sampled from distribution data to a second predicted position, for example, to a center location of the lane the object is traveling in. In some examples, a reference line may be determined based on the current position of the object and the map data. For example, a reference line from the current position of the object to a location in the lane may be determined based on a distance that is substantially similar to that of a distance from the current position to a predicted position sampled from the distribution data. Additionally, or alternatively, the reference line may be altered based on a vehicle dynamics model. For example, the reference line may be shortened or extended based on a vehicle dynamics model configured to model real world actions of an object, such as, for example, slowing down around a curve, accelerating out of a turn, etc.

The techniques discussed herein may improve a functioning of a computing device, such as a computing device of an autonomous vehicle, in a number of ways. For example, the various techniques described herein provide technical improvements in the environment modeling and predictive capabilities of the autonomous vehicles, as well as technical advantages in reducing computing resources and improving efficiency of the prediction and decision-making components of autonomous vehicles by examining an object in the environment with corresponding interactions of other objects in the environment rather than examining an object in an isolated manner (e.g., ignoring the interactions of other agents). For example, determining a predicted position of an object using features of additional objects encoded relative to the object allows for N-sets of possible futures for all of the objects in an environment to be determined, requiring a lesser amount of central processing unit (CPU) and/or graphics processing unit (GPU) power than determining N-sets of predicted trajectories for each object that may not be compatible (e.g., trajectories resulting in a collision). The techniques described herein may also allow for more efficient sampling of distribution data by focusing the distribution data to only include predicted positions that meet a criterion. Additionally, the techniques may determine realistic trajectories (e.g., following the curvature of a lane) for objects outside of a bounded area without the use of scene context data. Additionally, determining futures of objects in an environment may improve the functioning of subsequent subsystems (e.g., planning systems) which rely on such data for safe vehicle operation. Thus, the techniques described herein may improve a functioning of a computing device as well as improve safety outcomes.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, in an aerial surveying context, or in a nautical context. Additionally, the techniques described herein may be used with real data (e.g., captured using sensor(s)), simulated data (e.g., generated by a simulator), or any combination of the two.

FIG. 1 is a pictorial flow diagram of an example process 100 for capturing sensor data, encoding features into a node and an edge of a graph neural network (GNN), and sampling a predicted position of an object from distribution data output by the GNN.

At operation 102, the process 100 may include capturing and/or receiving sensor data of a physical or simulated environment. An example 104 illustrates a vehicle 106 capturing sensor data 108 of an environment. In some examples, the sensor data 108 may comprise lidar data, radar data, sonar data, time-of-flight data, or other depth data. For example, the operation 102 may include capturing image data and generating depth data based on the captured image data.

At operation 110, the process 100 may include determining a first feature associated with an object in the environment. In some examples, operation 110 may include determining first data representing a state of the object in the environment. In some examples, the state may include, but is not limited to, a pose of the object, a position of the object, an acceleration of the object, a speed of the object, a size of the object, a type of the object, a lighting state of the object, and the like.

In some examples, an object feature component associated with the vehicle 106 may determine the first feature associated with the object by processing the first data representing the state of the object with a machine learned (ML) model. For example, the first data representing the state of the object may be input into a first ML model and processed to determine output data, such as, for example, second data including the first feature associated with the object. In some examples, the first ML model may be configured as a recurrent neural network (RNN). In some examples, the second data may be configured as multi-dimensional data and may include any number of channels corresponding to the number of features associated with the object. For example, the first feature may be configured as a feature vector including vectorized object elements encoded as a feature vector.

At operation 112, the process 100 may include determining a second feature associated with the environment. In some examples, operation 112 may include determining third data representing a view of the environment. In some examples, the third data may be represented in a plan view or top-down view. In other instances, the third data may be represented in an elevation view or a side view. The third data representing the view of the environment may be determined using the sensor data 108 and/or map data associated with the environment and received from a map data server. In some examples, the view of the environment may represent various elements within the environment of the vehicle, including but not limited to roads, lanes, curbs, shoulders, crosswalks, buildings, trees, medians, street signs, traffic signals, speed limits, etc.

In some examples, an environment feature component associated with the vehicle 106 may determine the second feature associated with the environment by processing the third data representing the view of the environment with an ML model. For example, the third data representing the view of the environment may be input into a second ML model and processed to determine output data, such as, for example, fourth data including a second feature associated with the environment. The second ML model may be configured as an RNN or a convolution neural network (CNN).

The map data received in operation 112 may include data representing various map features (or map elements) within the environment of the autonomous vehicle, including but not limited to roads, lanes, curbs, shoulders, crosswalks, buildings, trees, medians, street signs, traffic signals, speed limits, etc. In some cases, the map data may depict these and other types of permanent or semi-permanent map elements (e.g., road closures, road damage, construction sites, accidents, etc.), but might not include impermanent objects such other vehicles, bicycles, and pedestrians in the environment, or temporary road features such as disabled vehicles, road hazards, or short-term construction projects. In some examples, the fourth data may be configured as multi-dimensional data and may include any number of channels corresponding to the number of features associated with the environment. For example, the second feature may be configured as a feature vector including one or more vectorized environment and/or map elements encoded as a feature vector.

An example 114 illustrates the sensor data 108 captured by the vehicle 106 and used to determine the object feature 116, and the map data 118 associated with the environment used to determine the environment feature 120. In some examples, the first feature may correspond to the object feature 116 and the second feature may correspond to the environment feature 120. In some examples, a portion of the sensor data 108 corresponding to the object may be processed to determine the object feature 116. In some examples, the environment feature 120 may be determined using the sensor data 108 and the map data 118. For example, the sensor data 108 and/or map data 118 may be processed to determine a feature map representing the environment, and the second feature may be determined based on a current position of the object in the environment and a corresponding position on the feature map, where the second feature may be extracted from the feature map at the current position of the object, providing scene context features relative to the position of the object.

At operation 122, the process 100 may include determining a first node of a graph neural network (GNN) representing the first feature (e.g., the object feature 116) and the second feature (e.g., the environment feature 120). At operation 122, the vehicle 106 may generate and/or update a GNN (or other graph structure) to include the object feature(s) 116 and/or the environment feature(s) 120 associated with the first node representing the object.

In some cases, a modeling component associated with the vehicle 106 may receive vectorized representations of objects (e.g., map elements and/or objects) from the object feature component and/or the environment feature component, and may create new nodes within the GNN, remove nodes from the GNN, and/or modify existing nodes of the GNN based on the received map data and/or entity data. Additionally, the modeling component may create and maintain edge features associated with node-pairs in the GNN. As noted above, the nodes in the GNN may store sets of attributes representing an object, and the edge features may include data indicating the relative information (e.g., positions, poses, etc.) of pairs of nodes.

At operation 124, the process 100 may include determining an edge connecting the first node to a second node of the GNN representing the vehicle 106. In some examples, the edge may represent a position of the object or the vehicle as a relative position. In some examples, the edge may be configured as a bidirectional edge of the GNN. That is, with respect to the first node, the edge may represent a position of a target (e.g., the vehicle 106) relative to a source (e.g., the object). Additionally, or alternatively, with respect to the second node, the edge may represent a position of a target (e.g., the object) relative to a source (e.g., the vehicle 106).

As described above, an edge within the GNN may be associated with a pair of the nodes, and edge data (or edge features) associated with the edge may include relative data between a source node and a target node of the pair of nodes. As an example, an edge connecting a first node representing the object and a second node representing the vehicle may store or be associated with edge data including the relative distance, relative yaw, relative velocity, relative pose, relative size, relative acceleration, relative permissibility, and the like, between the first node and the second node. In some examples, the GNN may be fully connected, so that a distinct edge is associated with each different pair of nodes. In other examples, the GNN may be partially connected, so that not every distinct pair of nodes has an associated edge.

An example 126 illustrates the environment 128 including the vehicle 106, the object 130, the first node 132 associated with the object 130, the second node 134 associated with the vehicle 106, and the edge 136 connecting the first node 132 to the second node 134. Though not depicted in FIG. 1 for clarity of illustration, in some examples, the GNN may be a fully connected structure in which each distinct pair of nodes is associated with a unique edge feature and/or edge data. Additionally, or alternatively, the GNN may include additional nodes for each object in the environment and/or additional edges connecting the additional nodes. The process of updating the GNN nodes and/or edges between timesteps is described in greater detail with respect to FIG. 7.

At operation 138, the process 100 may include determining an output representing distribution data including first predicted positions for the object 130 in the future. In some examples, an inference operation may be performed to update the node states and/or edge features of the GNN. Additionally, or alternatively, a distribution component associated with the vehicle 106 may determine the distribution data representing the predicted positions of the object 130 based on the updated GNN. Additionally, or alternatively, the output may represent a predicted position of the object 130 in the future.

As noted above, the graph structure of the GNN includes nodes representing features associated with a state of an object 130 and/or features associated with map elements associated with the object 130, which combine to represent a current state of the environment 128. In some examples, the GNN may be a fully stateless structure that can be newly generated each time a GNN generation process is executed, based on the data perceived by the autonomous vehicle 106 and/or the map data received by the autonomous vehicle 106 from a map server.

Additionally or alternatively, the GNN may fully or partially preserve its state during subsequent executions of the GNN generation process, in which certain object nodes, attributes, and/or edge data may be preserved from a previous version of the GNN while other data is updated. For instance, objects within the environment that were previously perceived by the autonomous vehicle 106 but may have moved to a predicted position at a future time, may be retained within the GNN and/or may be updated based on the prediction data determined from the previous GNN.

The modeling component may support inference operations and functionality based on machine-learning techniques, to update the nodes and/or edge features to represent a predicted future state of the environment 128. For instance, the inference operations performed by the modeling component to update the state of the GNN may be based entirely on a current state of the GNN. The modeling component may infer that an object 130 in the environment may proceed to a predicted position based on its current velocity and trajectory, within the constraints of the map elements and based on the influence of the other objects in the proximity of the object 130.

As described herein, the inference operations may use machine learning techniques (e.g., trained based on driving logs and/or other training data) to determine a predicted future state of the GNN based on the current state of the GNN. The predicted future state of the GNN may correspond to updated object positions, velocities, trajectories, intents, and/or interactions that may occur between objects in the environment. Additionally, within the environment represented by the GNN, the predicted future positions and/or state of one object is often related to the predicted future positions and/or states of other objects, and thus a single execution of an inference process on the GNN may provide updated node states (representing inferred future positions, velocities, trajectories, etc.) for multiple (e.g., all)

object nodes in the GNN. For such inference processes, and for other updates to the GNN that change the states of nodes, the modeling component also may perform any corresponding updates to the edge features connected to those nodes, so that the updated edge features store the accurate relative information based on the nodes associated with those edge features.

As described below, updates to the nodes and edges of the GNN may be based on inference operations performed by the GNN, and/or based on new observations perceived by the autonomous vehicle. For instance, after the autonomous vehicle initially perceives an entity in the environment at a first position, first velocity, first trajectory, etc., the autonomous vehicle may perceive the entity at a different time, having a different position, velocity, or trajectory, etc. In some cases, the autonomous vehicle also may perceive attributes of map elements (e.g., positions, sizes, etc.) that are different from the map data received from the map server. The updated observations perceived by the autonomous vehicle may be provided to the modeling component, where they may be used to update the corresponding node(s) in the GNN, and if necessary, to propagate the updates through the edge features and/or other nodes of the GNN.

To determine a predicted state of an object at a future time, distribution component associated with the autonomous vehicle may retrieve node data and/or edge feature data from the updated GNN, and may decode the data to determine the distribution data representing the predicted positions of an object a future time. A predicted position and/or state of an object may include, but is not limited to, a predicted position, velocity, acceleration, trajectory, yaw, pose, or any other attribute of an object within the environment. In some implementations, the distribution component need not decode the entire GNN, but may select specific entities and extract/decode the corresponding node data and edge features, to perform state predictions for the selected object.

An example 140 illustrates the neural network 142 and the neural network output 144 including the predicted position distribution 146 for the object 130. In some examples, the neural network 142 may be configured as the GNN, and the neural network output 144 may be configured as the output from the GNN. The predicted position distribution 146 included in the neural network output 144 is described in greater detail with respect to FIG. 7.

In some examples, the distribution component may evaluate the distribution data 144 to determine focused distribution data including a subset of predicted positions 146 that meet a criterion, allowing for more efficient sampling of the predicted positions 146 (e.g., removing impossible real-world scenarios, influencing an object 130 to behave in a specific manner, etc.). In some examples, the criterion may be based on a type of an object 130, a characteristic of an object 130, map data, input data, or the like. In some examples, the distribution data 144 may include one or more predicted positions 146 of an object 130 that may not reflect real world operation of the object 130. For example, one or more predicted positions 146 of the distribution data 144 may not conform to rules of the road (which may be reflected by map data and/or input data), such as, for example, stop signs, traffic lights, speed limits, construction zones, and the like. Additionally, or alternatively, it may be desirable to evaluate an object 130 acting in an adversarial manner (e.g., driving recklessly, turning from an improper lane, performing a sudden stop, etc.). In some examples, the distribution data 144 may include a limited number of predicted positions 146 that reflect the object acting in an adversarial manner, such that using traditional random sampling techniques may rarely result in selection of such predicted positions 146. By evaluating the distribution data 144 with respect to a criterion (e.g., enforcing one or more rules of the road, performing in an adversarial manner, etc.), a subset of the distribution data 144 may be determined including only predicted positions 146 that meet the criterion.

At operation 148, the process 100 may include determining a predicted position of the object 130 in the future. In some examples, the predicted position of the object may be determined based on sampling from the distribution data 146.

A predicted position of an object 130 in the future (e.g., from one timestep to the next) may be determined in various ways. In some examples, a predicted position of an object 130 may be output by the GNN following an inference operation and/or an update to the GNN. In some examples, a predicted position of an object 130 may be determined by sampling from the predicted position distribution 146 included in the neural network output 144 according to a sampling technique, such as, for example, random sampling, gaussian sampling (e.g., following a sampling pattern based on a gaussian distribution), most likely sampling (e.g., taking an average, such as the min, max, or mean of the distribution), or overwrite sampling (e.g., selecting a specific position for an object 130 that may or may not be included in the distribution). For example, a first predicted position of the object 130 may be determined by sampling from the predicted position distribution 146 output by the GNN.

Once a predicted position of an object 130 has been determined (e.g., a predicted position at timestep 1), additional predicted positions in the future may be determined (e.g., a predicted position at timestep 2) from the predicted position. For example, with the first predicted position determined, the first graph node 132 representing the object 130 may be updated to reflect first feature(s) associated with the object 130 at the first predicted position and/or second feature(s) associated with the environment 128 at the first predicted position. Accordingly, a second predicted position distribution 146, including second predicted positions for the object 130 (at timestep 2, for example), may be output by the GNN following the update of the first graph node 132 and/or an inference operation. Since the first predicted position of the object 130 is reflected by the updated graph node, the second predicted position distribution 146 may include second predicted positions from the first predicted position. The second predicted position distribution 146 may then be sampled to determine a second predicted position of the object 130. This process may be repeated any number of times to determine a number of predicted positions of an object 130 at incremental timesteps.

Additionally, or alternatively, the predicted position distribution 146 may be sampled using various sampling techniques. In some examples, a sampling technique for sampling a predicted position distribution 146 may be determined based on a classification type of a graph node (e.g., is the graph node associated with the vehicle 106, an object 130, a specific type of object, etc.), the predicted positions of the predicted position distribution 146 (e.g., whether the predicted positions are in a predefined area), a distribution type of the predicted position distribution 146, an input associated with the predicted position distribution 146 (e.g., a reference trajectory associated with an object), or the like.

In some examples, different sampling techniques may be employed on the same object 130 at different timesteps. For example, a first predicted position for an object 130 may be determined at a first time using a gaussian sampling technique, and a second predicted position for the object 130 may be determined at a second time using a sampling technique configured to maximize progress of the object 130 at the second time.

Additionally, or alternatively, different sampling techniques may be employed on different objects at the same timestep. For example, a first predicted position for a first object (e.g., the object 130) may be determined at a first time using a first sampling technique configured to minimize progress of the first object at the first time, and a second predicted position for a second object (e.g., the vehicle 106 or an additional object in the environment 128) may be determined at the first time using a second sampling technique configured to maximize the progress of the second object at the first time.

Additionally, or alternatively, different sampling techniques may be employed to overwrite the predicted position distribution 146 output by the GNN for a specified object of multiple objects. For example, a predicted position distribution 146 for an object 130 may include predicted positions of the object 130, and an input, including a reference trajectory, may be received to configure the sampling technique to determine a predicted position of the object 130 that follows the reference trajectory. Additionally, or alternatively, an additional predicted position distribution for the vehicle 106 may include predicted positions for the vehicle 106, and an input, including a reference trajectory, may be received from a planning component of the vehicle 106 to configure the sampling technique to determine a predicted position of the vehicle 106 that follows the reference trajectory.

At operation 150, the process 100 may include determining a predicted trajectory of the object 130. In some examples, the predicted trajectory of the object 130 may be based on the predicted position of the object 130. Additionally, or alternatively, at operation 150, the process 100 may include controlling the vehicle 106 based on the predicted trajectory of the object 130. In some examples, the operation 150 may include generating a route, trajectory, and/or control signals for one or more systems of the vehicle 106 to navigate the vehicle 106 within the environment according to the predicted trajectory of the object 130 and/or additional predicted trajectories associated with additional objects in the environment.

An example 152 illustrates the environment 128 including the vehicle 106, the object 130, and the predicted trajectory 156 of the object 130 determined based on one or more predicted positions of the object 130, sampled from one or more predicted position distributions 146 using one or more sampling techniques 154 described herein.

Figure 2:
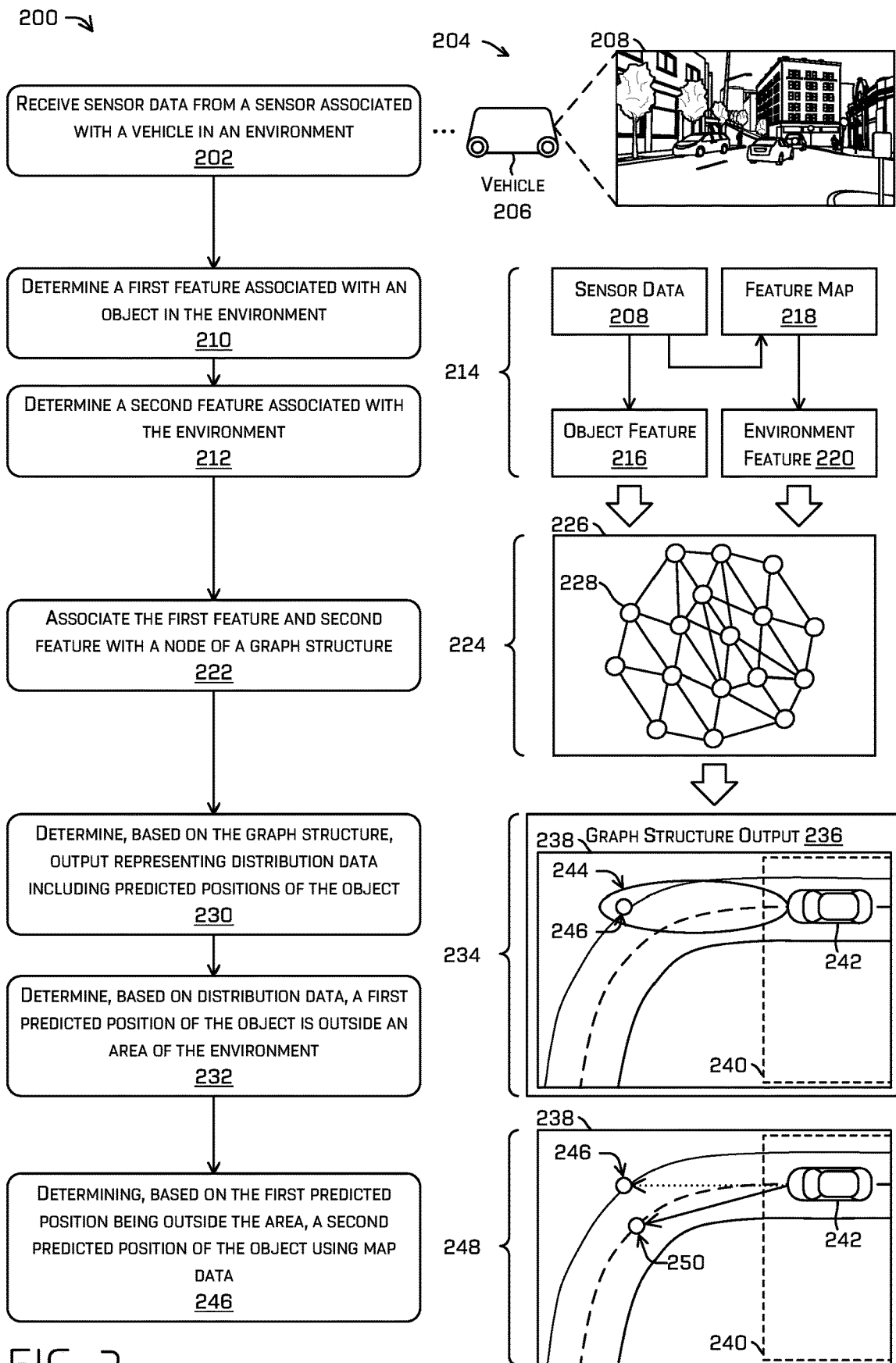
FIG. 2 is a pictorial flow diagram of an example process for capturing sensor data, encoding features into a node and an edge of a GNN, determining that a first predicted position of an object sampled from distribution data output by the GNN is outside of a specified area, and determining a second predicted position of the object based on map data.

FIG. 2 is a pictorial flow diagram of an example process 200 for capturing sensor data, encoding features into a node and an edge of a GNN, determining that a first predicted position of an object sampled from distribution data output by the GNN is outside of a specified area, and determining a second predicted position of the object based on map data.

At operation 202, the process 200 may include capturing and/or receiving sensor data of an environment. An example 204 illustrates a vehicle 206 capturing sensor data 208 of an environment. In some examples, the sensor data 208 may comprise lidar data, radar data, sonar data, time-of-flight data, or other depth data. For example, the operation 202 may include capturing image data and generating depth data based on the captured image data.

At operation 210, the process 200 may include determining a first feature associated with an object in the environment. In some examples, operation 210 may include determining first data representing a state of the object in the environment. In some examples, the state may include, but is not limited to, a pose of the object, a position of the object, an acceleration of the object, a speed of the object, a size of the object, a type of the object, a lighting state of the object, and the like.

In some examples, at operation 210, an object feature component associated with the vehicle 206 may determine the first feature associated with the object by processing the first data representing the state of the object with a machine learned (ML) model. For example, the first data representing the state of the object may be input into a first ML model and processed to determine output data, such as, for example, second data including the first feature associated with the object. In some examples, the first ML model may be configured as a recurrent neural network (RNN). In some examples, the second data may be configured as multi-dimensional data and may include any number of channels corresponding to the number of features associated with the object. For example, the first feature may be configured as a feature vector including vectorized object elements encoded as a feature vector.

At operation 212, the process 200 may include determining a second feature associated with the environment. In some examples, operation 212 may include determining third data representing a view of the environment. In some examples, the third data may be represented in a plan view or top-down view. In other instances, the third data may be represented in an elevation view or a side view. The third data representing the view of the environment may be determined using the sensor data 208 and/or map data associated with the environment and received from a map data server. In some examples, the view of the environment may represent various elements within the environment of the vehicle, including but not limited to roads, lanes, curbs, shoulders, crosswalks, buildings, trees, medians, street signs, traffic signals, speed limits, etc.

In some examples, an environment feature component associated with the vehicle 206 may determine the second feature associated with the environment by processing the third data representing the view of the environment with an ML model. For example, the third data representing the view of the environment may be input into a second ML model and processed to determine output data, such as, for example, fourth data including a second feature associated with the environment. The second ML model may be configured as an RNN or a convolution neural network (CNN).

The map data received in operation 212 may include data representing various map features (or map elements) within the environment of the autonomous vehicle, including but not limited to roads, lanes, curbs, shoulders, crosswalks, buildings, trees, medians, street signs, traffic signals, speed limits, etc. In some cases, the map data may depict these and other types of permanent or semi-permanent map elements (e.g., road closures, road damage, construction sites, accidents, etc.), but might not include impermanent objects such other vehicles, bicycles, and pedestrians in the environment, or temporary road features such as disabled vehicles, road hazards, or short-term construction projects. In some examples, the fourth data may be configured as multi-dimensional data and may include any number of channels corresponding to the number of features associated with the environment. For example, the second feature may be configured as a feature vector including one or more vectorized environment and/or map elements encoded as a feature vector.

An example 214 illustrates the sensor data 208 captured by the vehicle 206 and used to determine the object feature 216, and a feature map 218 associated with an area of the environment used to determine the environment feature 220. In some examples, the first feature may correspond to the object feature 216 and the second feature may correspond to the environment feature 220. In some examples, a portion of the sensor data 208 corresponding to the object may be processed to determine the object feature 216. In some examples, the environment feature 220 may be determined using the sensor data 208 and the map data. For example, the sensor data 208 and/or map data may be processed to determine a feature map 218 representing an area in the environment, and the second feature may be determined based on a current position of the object in the environment and a corresponding position on the feature map 218, where the second feature may be extracted from the feature map 218 at the current position of the object, providing scene context features relative to the position of the object.

At operation 222, the process 200 may include associating the first feature (e.g., the object feature 216) and the second feature (e.g., the environment feature 220) with a node of a graph structure. In some examples, the graph structure may be configured as the graph structure, the GNN, and/or the neural network 142 as described with respect to FIG. 1. At operation 222, the vehicle 206 may generate and/or update a graph structure to include the object feature(s) 216 and/or the environment feature(s) 220 associated with the first node representing the object.

In some cases, a modeling component associated with the vehicle 206 may receive vectorized representations of objects (e.g., map elements and/or objects) from the object feature component and/or the environment feature component, and may create new nodes within the graph structure, remove nodes from the graph structure, and/or modify existing nodes of the graph structure based on the received map data and/or object data. Additionally, the modeling component may create and maintain edge features associated with node-pairs in the graph structure. As noted above, the nodes in the graph structure may store sets of attributes representing an object, and the edge features may include data indicating the relative information (e.g., positions, poses, etc.) of pairs of nodes.

An example 224 illustrates an example graph structure 226 of a neural network, such as, for example a GNN. The graph structure 226 may include one or more nodes, including the node 228 associated with the object, and one or more edges connecting the nodes. Though not depicted in FIG. 2 for clarity of illustration, in some examples, the graph structure may be a fully connected structure in which each distinct pair of nodes is associated with a unique edge feature and/or edge data. Additionally, or alternatively, the graph structure may include additional nodes for each object in the environment and/or additional edges connecting the additional nodes. The process of updating the graph nodes and/or edges between timesteps is described in greater detail with respect to FIG. 7.

At operation 230, the process 200 may include determining output representing distribution data including predicted positions of the object. In some examples, the output representing the distribution data may be based at least in part on the graph structure. For example, an inference operation may be performed to update the node states and/or edge features of the graph structure. Additionally, or alternatively, a distribution component associated with the vehicle 206 may determine the distribution data representing the predicted positions of the object based on the updated GNN. Additionally, or alternatively, the output may represent a predicted position of the object in the future.

At operation 232, the process 200 may include evaluating the distribution data to determine that a first predicted position of the object is outside of the area of the environment. Additionally, or alternatively, the distribution data for the object may be evaluated to determine whether the predicted positions of the object, or a threshold number of the predicted positions, are outside of the area or inside of the area. In some examples, the area of the environment may correspond to the area of the environment represented by the feature map 218. That is, nodes associated with objects in the area of the environment and/or edges connecting such nodes may be updated based on environment features 220 extracted from a position on the feature map 216 corresponding to a position of an object in the environment. In some examples, the area may be configured as a top-down scene associated with the vehicle 206 and generated based on the sensor data 208. Additionally, or alternatively, the area of the environment may be limited by a specified distance, a trajectory and/or speed associated with the vehicle 206, an area in which the sensors are able to capture sensor data and determine environmental features, and the like.

An example 234 illustrates the graph structure output 236 including the environment 238, a portion of the area of the environment 240, the object 242, the distribution data 244 indicating the predicted positions (illustrated as being overlayed on the environment for clarity) for the object 242, including the first predicted position 246 for the object 242. When a predicted position of the object 242 is outside of the area of the environment 240, the graph node 228 associated with the object 242 may be updated, based on the position of the object 242 in relation to the feature map 218. As previously described, the feature map 218 may be associated with the area of the environment 240 and may have null scene context data for areas outside of the environment. As such, the graph node 228 may be updated, replacing the environment feature 220 with null scene context data. At subsequential timesteps, the graph structure 226 may output distribution data based on the feature(s) associated with the object 242 and the null scene context features associated with the environment 238, resulting in predicted positions of the object that may not consider features of the environment 238.

At operation 246, the process 200 may include determining a second predicted position of the object 242 using map data. In some examples, the second predicted position of the object 242 may be partially based on the first predicted position 246 sampled from the predicted position distribution 244 output by the graph structure 226.

An example 248 illustrates a road in the environment 238 on which the object 242 is traveling having a turn or a curve. In some examples, subsequent distribution data of the object 242 outside of the area may include predicted positions that do not follow the curvature of the road (e.g., the first predicted position 246), and iteratively predicting the positions in such a scenario may result in an unrealistic predicted trajectory of the object 242 off of the road. Accordingly, determining predicted positions for the object 242 outside of the area of the environment 240 using the map data may be more accurate in lieu of the environment feature(s) 220 associated with the environment 238.

For example, determining predicted positions and/or trajectories of an object 242 outside of a bounded area of an environment 240 (e.g., when scene context is null) using the map data outside of the bounded area 240 may result in more accurate predictions. In some examples, the map data may be utilized to project a first predicted position 246 sampled from distribution data 244 to a second predicted position 250, for example, to a center location of the lane the object 242 is traveling in. In some examples, a reference line may be determined based on the current position of the object 242 and the map data. For example, a reference line from the current position of the object 242 to a location in the lane (e.g., the second predicted position 250) may be determined based on a distance that is substantially similar to that of a distance from the current position of the object 242 to the first predicted position 246 sampled from the distribution data 244. Additionally, or alternatively, the reference line may be altered based on a vehicle dynamics model, such as, for example, a distance of the reference line from a current position to a predicted position. For example, the distance of the reference line may be shortened or extended based on a vehicle dynamics model configured to model real world actions of an object 242, such as, for example, slowing down around a curve, accelerating out of a turn, etc.

In some examples, the operation 246 may include determining a predicted trajectory of the object 242. In some examples, the predicted trajectory of the object 242 may be based on the second predicted position 250 of the object 242. Additionally, or alternatively, at operation 246, the process 200 may include controlling the vehicle 206 based on the second predicted position 250 and/or a predicted trajectory of the object 242. In some examples, the operation 246 may include generating a route, trajectory, and/or control signals for one or more systems of the vehicle 206 to navigate the vehicle 206 within the environment 238 according to the predicted trajectory of the object 242 and/or additional predicted trajectories associated with additional objects in the environment 238.

Figures 3A, 3B:
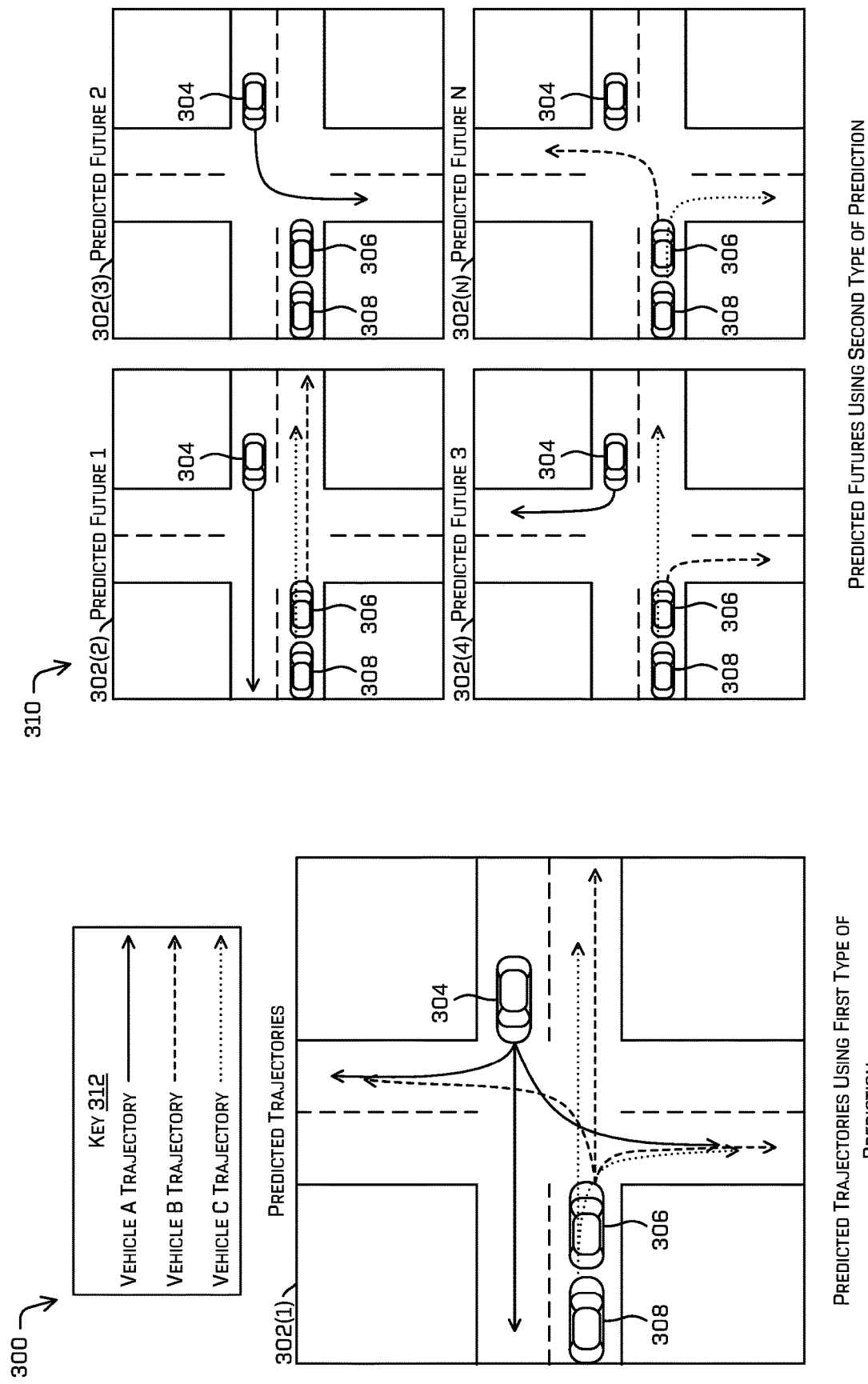
FIG. 3A depicts an example environment viewed from a top-down view and predicted trajectories for vehicles in the environment determined using a first type of prediction.
FIG. 3B depicts an example environment viewed from a top-down view and predicted futures for vehicles in the environment determined using a second type of prediction.

FIG. 3A depicts an example 300 including an environment 302(1) viewed from a top-down view and predicted trajectories for vehicles (e.g., vehicle A 304, vehicle B 306, and/or vehicle C 308) in the environment 302(1) determined using a first type of prediction. The predicted trajectories for each of the vehicles 304, 306, and 308 may be identified using the key 312.

As illustrated in example 300, each vehicle 304, 306, and 308 (also referred to herein as object, entity, agent, etc.) may have one or more predicted trajectories, determined independent from one another. In some examples, the predicted trajectories in example 300 may be determined using only features associated with a node representing a specific vehicle 304, 306, and 308, and without the information encoded into the edge features between the nodes representing the relative information of additional vehicles in the environment 302(1). As can be seen from FIG. 3A, many of the trajectories of the vehicles 304, 306, and 308 overlap, which may result in a collision and/or an unrealistic future for the environment 302.

FIG. 3B depicts an example 310 including an environment 302(2)-(N) viewed from a top-down view and predicted futures (e.g., predicted future 1-N, where N is any integer greater than 1) for vehicles (e.g., vehicle A 304, vehicle B 306, and/or vehicle C 308) in the environment 302(2)-(N) determined using a second type of prediction. The predicted trajectory for each of the vehicles 304, 306, and 308 in the individual futures may be identified using the key 312.

As illustrated in example 310, each of the predicted futures may include a single predicted trajectory for each vehicle 304, 306, and 308 in the environment 302(2)-(N), determined in a relative to one another. In some examples, these predicted futures may be determined using the features associated with a node representing a specific vehicle 304, 306, and 308 and the information encoded into the edge features between the nodes representing the relative information of additional vehicles in the environment 302(2)-(N). As can be seen from FIG. 3B, each of the futures contains a possible trajectory for each of the vehicles 304, 306, and 308 (e.g., trajectories that do not result in a potential collision).

Take, for example, the environment 302(3) including predicted future 2 in the example 310. In predicted future 2, vehicle A 304 has a predicted trajectory making a left turn across oncoming traffic, determined using predicted positions of vehicle A 304 at various incremental timesteps (e.g., 8 predicted positions determined over 8 seconds, one per second), such as, for example, predicted positions output by a GNN corresponding to the GNN described with respect to FIG. 1. During the updating process of the graph nodes associated with the vehicles 304, 306, and 308, the predicted position distributions output for vehicle B 306 and/or vehicle C 308 may be based on the predicted position of vehicle A 304. For example, the edge between vehicle B 306 and vehicle A 304 and the edge between vehicle C 308 and vehicle A 304 may include information representing a state of vehicle A 304, such as, for example, a state of turn signals of vehicle A 304, indicating that vehicle A 304 is going to make the turn, and the acceleration of vehicle A 304, indicating that vehicle A 304 is going to begin the turn at the next time step. As such, the distribution(s) output for vehicle B 306 and/or vehicle C 308 may include predicted positions considering the turn of vehicle A 304 and avoiding an unrealistic predicted position of vehicle B 306 and/or vehicle C 308 and/or a collision.

Although FIG. 3B illustrates 4 predicted futures in the environments 302(2)-(N), any number of futures (e.g., tens, hundreds, thousands, etc.) may be determined. Additionally, or alternatively, the processing may be executed in parallel, such as, for example, on one or more graphics processing units (GPUs) to determine the futures substantially in parallel.

Figure 4A:
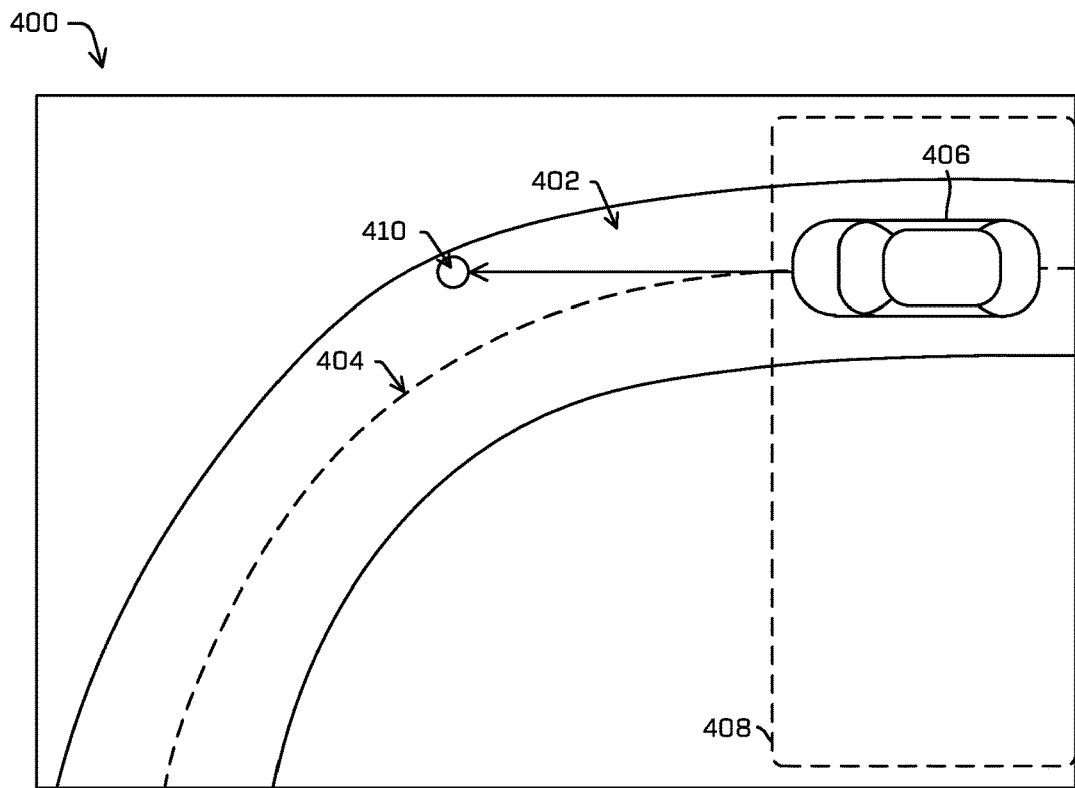
FIG. 4A depicts an example environment viewed from a top-down view and a predicted position determined using a first type of prediction.

FIG. 4A depicts an example environment 400 viewed from a top-down view including a road 402 (and a center position of the road 404) on which a vehicle 406 is traveling. The environment 400 may also include a bounded area 408 (e.g., an area corresponding to an autonomous vehicle as described with respect to FIG. 2) and a predicted position 410 determined using a first type of prediction. In some examples, the first predicted position 410 may correspond to the first predicted position 246 sampled from the distribution data 244 as described with respect to FIG. 2. Additionally, or alternatively, the first type of prediction may correspond to determining the first predicted position 246 by sampling from the distribution data 244 output by the graph structure as described in FIG. 2. In some examples, the first predicted position 410 may be determined as a result of the predicted positions of the vehicle 406 exiting the area 408, resulting in a node of a graph structure associated with the vehicle 406 being updated with null scene context data.

Figure 4B:
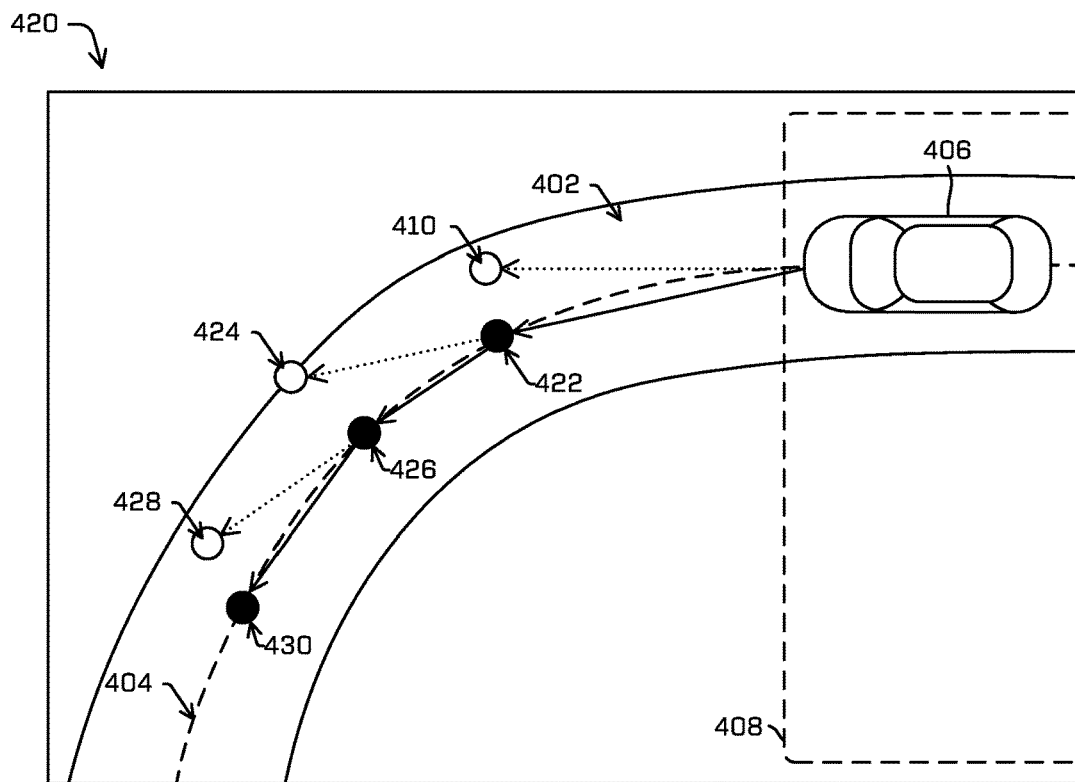
FIG. 4B depicts an example environment viewed from a top-down view and predicted positions determined using a second type of prediction compared to predicted positions determined using the first type of prediction.

FIG. 4B depicts an example environment 420 viewed from a top-down view including a road 402 (and a center position of the road 404) on which a vehicle 406 is traveling. The environment 400 may also include a bounded area 408

(e.g., an area corresponding to an autonomous vehicle as described with respect to FIG. 2).

As described with respect to FIG. 2, when a predicted position of the vehicle 406 is outside of the area 408, the graph node associated with the vehicle 406 may be updated, based on the position of the vehicle 406 in relation to a feature map associated with the area 408. That is, the feature map may be associated with the bounded area 408 and may have null scene context data for areas of the environment 420 outside of the bounded area 408. As such, the graph node may be updated, replacing the scene context data from the previous timestep with null scene context data. At subsequential timesteps, the graph structure may output distribution data based on the feature(s) associated with the vehicle 406 and the null scene context features associated with the environment 420, resulting in predicted positions of the vehicle 406 that may not consider features of the environment 420, such as, for example, the road 402.

As illustrated by FIG. 4B, a first predicted position 410 from timestep 0 (e.g., the current position of the vehicle 406) to timestep 1 (e.g., the first predicted position 410) may be determined by sampling from distribution output from the graph structure. As can be seen, the first predicted position 410 may position the vehicle 406 to being traversing off of the road 402 in the environment 420, thus resulting in an unrealistic trajectory of the vehicle 406.

When it is determined that the first predicted position 410 is outside of the area 408, a first projected position 422 may be determined. In some examples, the map data may be utilized to determine the first projected position 422. For example, by utilizing the map data, the first predicted position 410 may be projected toward the center position of the road 404, such as the first projected position 422. In some examples, a reference line may be determined based on the current position of the vehicle 406 and the map data. For example, a reference line from the current position of the vehicle 406 to the center position of the road 404 may be determined based on a distance that is substantially similar to that of a distance from the current position of the vehicle 406 to the first predicted position 410 sampled from the distribution data.

Continuing this process, the graph structure may be updated with the first projected position 422, and a second predicted position 424 may be sampled from a distribution of predicted positions of the vehicle 406 output by the graph structure. Again, utilizing the map data, the second predicted position 424 may be projected to a center position of the road 404, such as a second projected position 426, using a reference line. Additionally, or alternatively, the reference line may be altered based on a vehicle dynamics model. For example, the reference line may be shortened or extended based on a vehicle dynamics model configured to model real world actions of a vehicle 406, such as, for example, slowing down around a curve, accelerating out of a turn, etc. For example, the reference line used to determine the second projected position 426 may be shortened, resulting in the second projected position 426 being a shorter distance from the first projected position 422 than the second predicted position 424, due to the vehicle dynamics model indicating the vehicle 406 may slow down at this portion of the turn due to the curvature of the road. Additionally, or alternatively, the reference line used to determine a third projected position 430, based on a third predicted position 428 sampled from distribution of predicted positions output by the graph structure, may be extended, resulting in the third projected position 430 being a greater distance from the second projected position 426 than the third predicted position 428, due to the vehicle dynamic model indicating that the vehicle 406 may accelerate at this portion of the turn due to the curvature of the road.

Figure 5A:
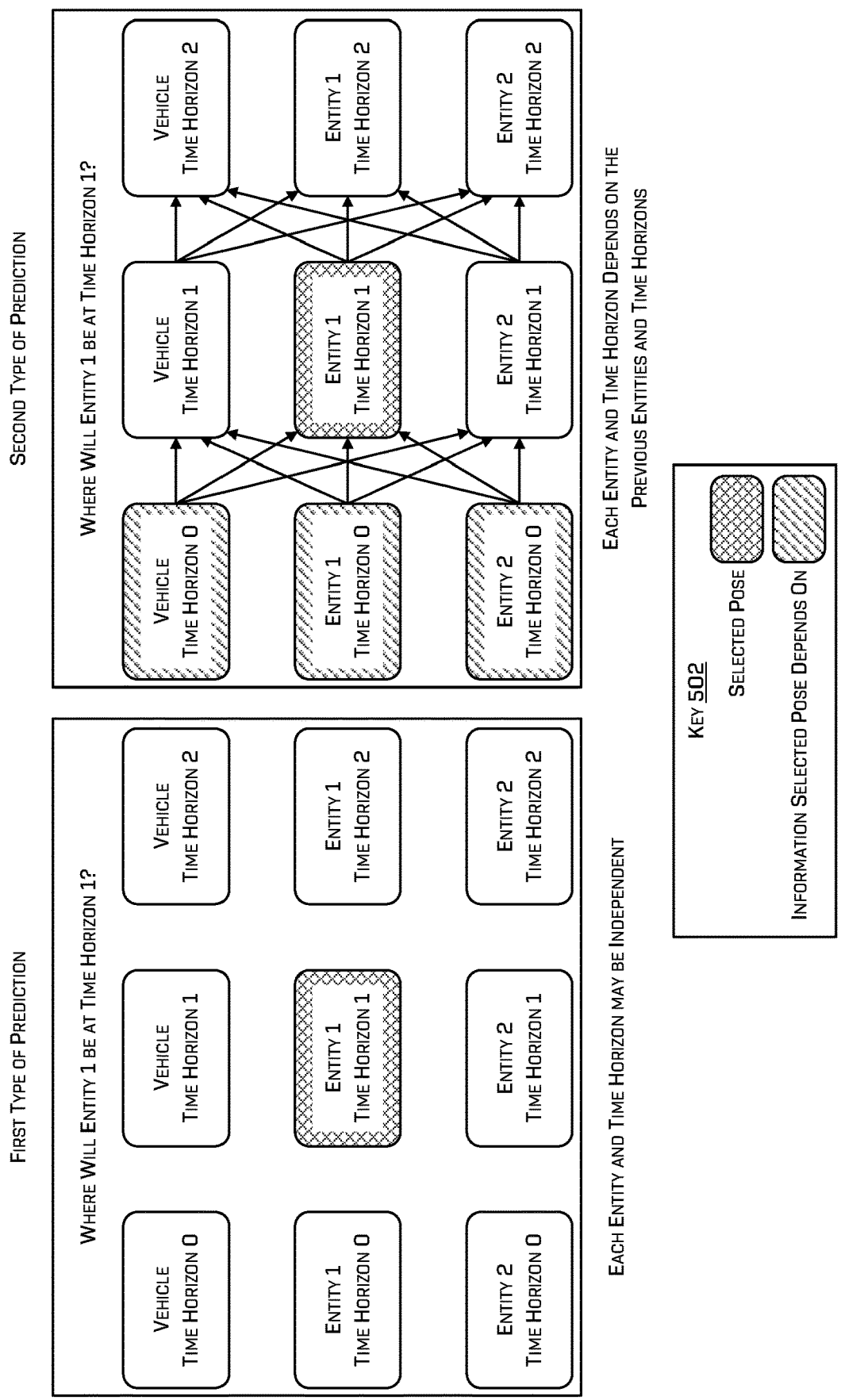
FIG. 5A depicts a diagram of an example structure for determining predicted positions at a first time using a first type of prediction and a second type of prediction.

FIG. 5A depicts a diagram of an example structure for determining predicted positions at a first time using a first type of prediction and a second type of prediction. The selected pose (e.g., the object that prediction is being performed on) and the information the selected pose depends on (e.g., the information and/or objects used to determine the prediction) may be identified using the key 502. In some examples, the first type of prediction may correspond to the first type of prediction as described with respect to FIG. 3A and/or the second type of prediction may correspond to the second type of prediction as described with respect to FIG. 3B.

As illustrated, determining a predicted position for entity 1 at time horizon 1 using the first type of prediction is determined independent from the information associated with the vehicle and/or entity 2 at any given time horizon. That is, using the first type of prediction, the predicted positions for entity 1 at time horizon 1 may be based only on the information associated with entity 1 at time horizon 1.

Alternatively, determining a predicted position for entity 1 at time horizon 1 using the second type of prediction is determined relative to the information of all entities from all previous time horizons. That is, using the second type of prediction, the predicted positions for entity 1 at time horizon 1 may be based on the information associated with the vehicle, entity 1, and entity 2 at time horizon 0. In this way, the predicted positions for entity 1 may be based on the previous position of entity 1 at time horizon 0, and the respective positions of the vehicle and entity 2 at time horizon 0, and one or more predicted future(s), such as, for example, predicted futures 1-N of example 310 as described with respect to FIG. 3B, may be determined for the environment including the vehicle, entity 1, and entity 2.

Figure 5B:
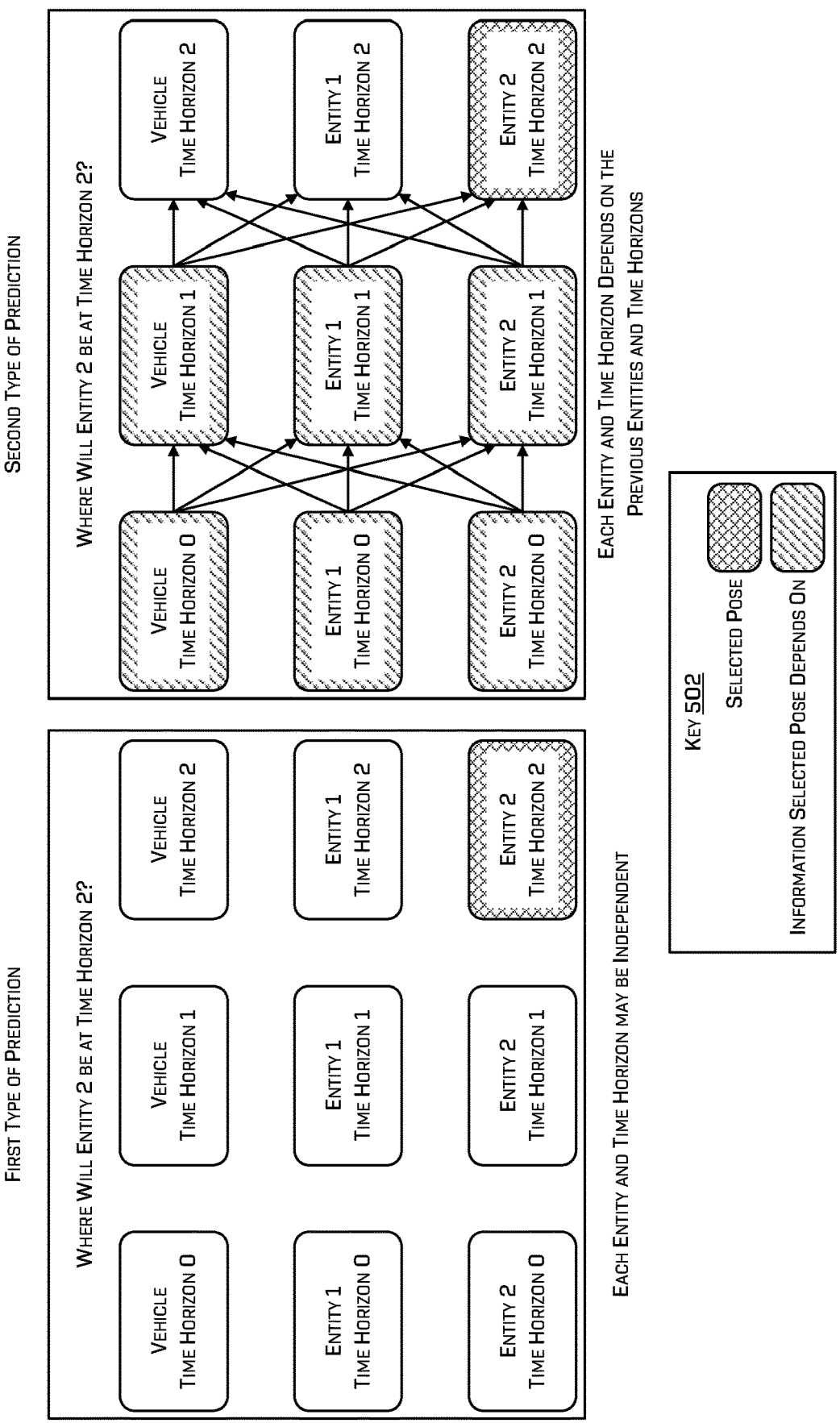
FIG. 5B depicts a diagram of an example structure for determining predicted positions at a second time using a first type of prediction and a second type of prediction.

FIG. 5B depicts a diagram of an example structure for determining predicted positions at a second time using a first type of prediction and a second type of prediction. The selected pose (e.g., the object that prediction is being performed on) and the information the selected pose depends on (e.g., the information and/or objects used to determine the prediction) may be identified using the key 502. In some examples, the first type of prediction may correspond to the first type of prediction as described with respect to FIG. 3A and/or the second type of prediction may correspond to the second type of prediction as described with respect to FIG. 3B.

Similar to FIG. 5A, the predicted positions for entity 2 at time horizon 2 may be determined using the first type of prediction and the second type of prediction. For example, determining a predicted position for entity 2 at time horizon 2 using the first type of prediction may be determined independent from the information associated with the vehicle and/or entity 1 at any given time horizon. That is, using the first type of prediction, the predicted positions for entity 2 at time horizon 2 may be based only on the information associated with entity 2 at time horizon 2.

Alternatively, determining a predicted position for entity 2 at time horizon 2 using the second type of prediction may be determined relative to the information of all entities from all previous time horizons. That is, using the second type of prediction, the predicted positions for entity 2 at time horizon 2 may be based on the information associated with the vehicle, entity 1, and entity 2 at time horizon 0 and time horizon 1. Given that time horizon 2 depends on time horizon 1, and time horizon 1 depends on time horizon 0, the graph structure may maintain the edge features associated with the other entities at the previous time horizons and update the features accordingly. In this way, the predicted positions for entity 2 may be based on the previous position of entity 2 at time horizon 1, and the respective positions of the vehicle and entity 1 at time horizon 1, and one or more predicted future(s), such as, for example, predicted futures 1-N of example 310 as described with respect to FIG. 3B, may be determined for the environment including the vehicle, entity 1, and entity 2.

Figure 6:
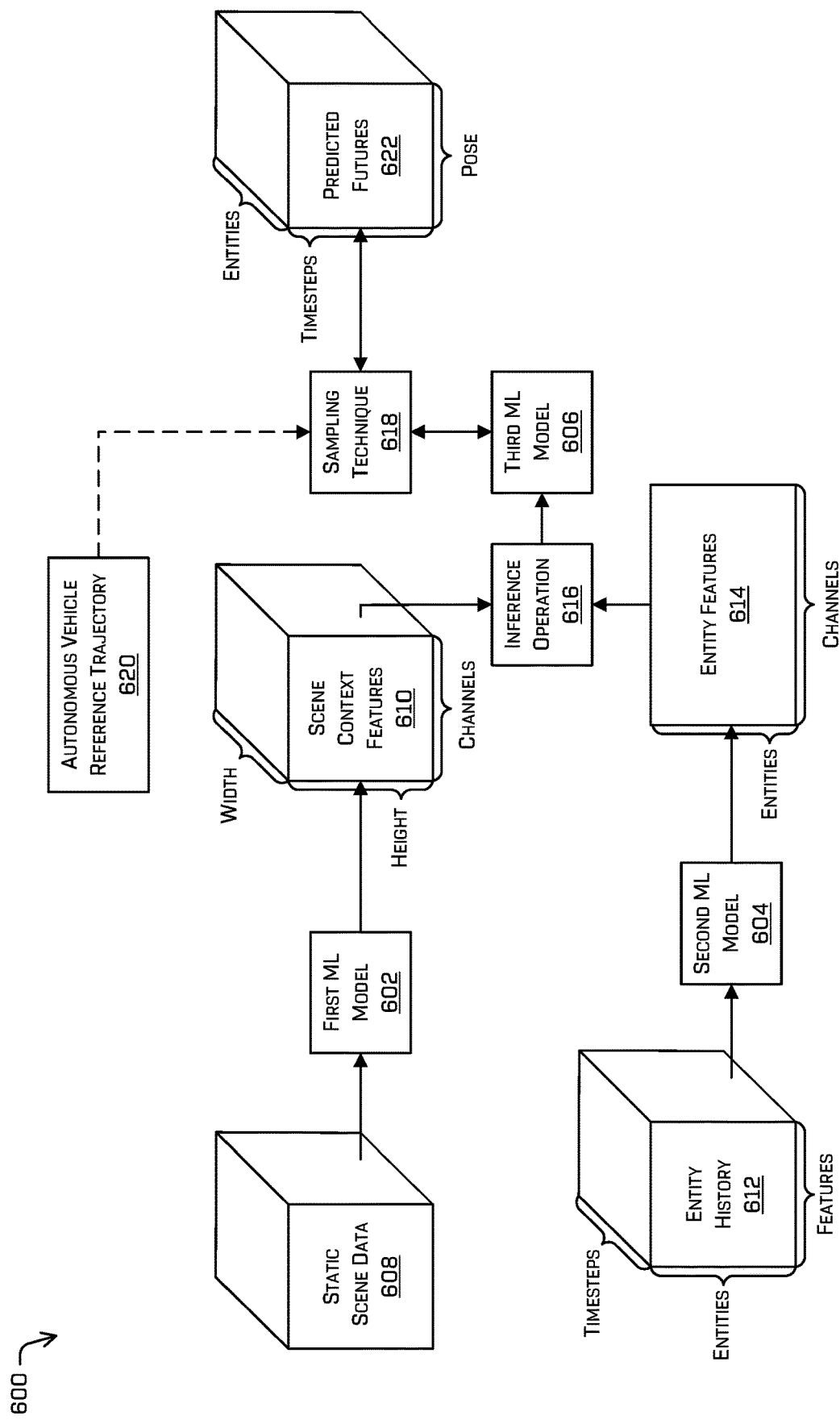
FIG. 6 depicts a block diagram of an example architecture for encoding features into a GNN and sampling a predicted position of an object from distribution data output by the GNN.

FIG. 6 depicts a block diagram of an example architecture 600 for encoding features into a GNN and sampling a predicted position of an object from distribution data output by the GNN. In some examples, the architecture 600 may include a first ML model 602, a second ML model 604, and/or a third ML model 606. In some examples, the first ML model 602 may be configured as an RNN and/or may correspond to the first ML model as described with respect to FIG. 1. Additionally, or alternatively, the second ML model 604 may be configured as an RNN, a CNN, and/or may correspond to the second ML model as described with respect to FIG. 1. Additionally, or alternatively, the third ML model 606 may be configured as a GNN and/or may correspond to the neural network 142 and/or the GNN as described with respect to FIG. 1.

The first ML model 602 may be configured to process static scene 608 data associated with an environment. In some examples, the static scene data 608 may be determined based on sensor data captured by a vehicle in the environment. Additionally, or alternatively, while not depicted in FIG. 6, the static t scene data 608 may be represented in a plan view, an elevation view, or a side view. The first ML model 602 may be configured to process the static scene data 608 to determine scene context features 610 associated with the environment. The scene context features 610 may include a number of channels corresponding to the features of the environment at the current timestep, where each channel may represent a feature (or a feature vector) at a position of the environment corresponding to a width and/or a height of the environment, capturing three-dimensional features of the environment represented by the sensor data.

The second ML model 604 may be configured to process an entity history 612 associated with the environment. In some examples, the entity history 612 may be based on previous iterations of the GNN and may include the features associated with each entity in the environment at each of the previous timesteps. The second ML model 604 may be configured to process the entity history 612 to determine entity features 614 for each entity at the current timestep. The entity features 614 may include a number of channels corresponding to the features of each entity in the environment at the current timestep.

Once the scene context features 610 and the entity features 614 have been determined for the current timestep, an inference operation 616 may be determined. In some examples, the inference operation 616 may include updating the nodes of the third ML model 606 (e.g., the GNN) based on the entity features 614 and the scene context features 610 at the given timestep. As a result of the inference operation 616, the third ML model 606 may output a distribution of predicted positions for each of the entities in the environment.

A sampling technique 618 may be employed to sample a single predicted position from each of the distribution of predicted positions of the entities. The sampling technique 618 may include various sampling techniques, and a different sampling technique 618 may be used to sample from the distribution of predicted positions for an entity between separate timesteps and/or to sample from the different distributions of predicted positions for the entities at the same timestep. In some examples, the sampling technique 618 may be configured as a Gaussian sampling technique (e.g., following a sampling pattern based on a gaussian distribution), a most likely sampling technique (e.g., taking an average, such as the min, max, or mean of the distribution), or an overwrite sampling technique (e.g., selecting a specific position for an object that may or may not be included in the distribution). Additionally, or alternatively, the sampling technique 618 for sampling a predicted position distribution may be determined based on a classification type of a graph node (e.g., is the graph node associated with an autonomous vehicle, an object, a specific type of object, etc.), the predicted positions of the predicted position distribution (e.g., whether the predicted positions are in a predefined area), a distribution type of the predicted position distribution, an input associated with the predicted position distribution (e.g., an autonomous vehicle reference trajectory 620), or the like.

Once a number of predicted positions have been determined for each entity corresponding to a number of timesteps (e.g., 8 predicted positions for each entity corresponding to 8 timesteps), predicted futures 622 for the environment may be determined. In some examples, the predicted futures 622 may include a pose of each entity in the environment across each of the timesteps. In some examples, the predicted futures 622 may be utilized to determine predicted trajectories of the entities, such as, for example, the predicted futures 1-N as described with respect to FIG. 3B.

Figure 7:
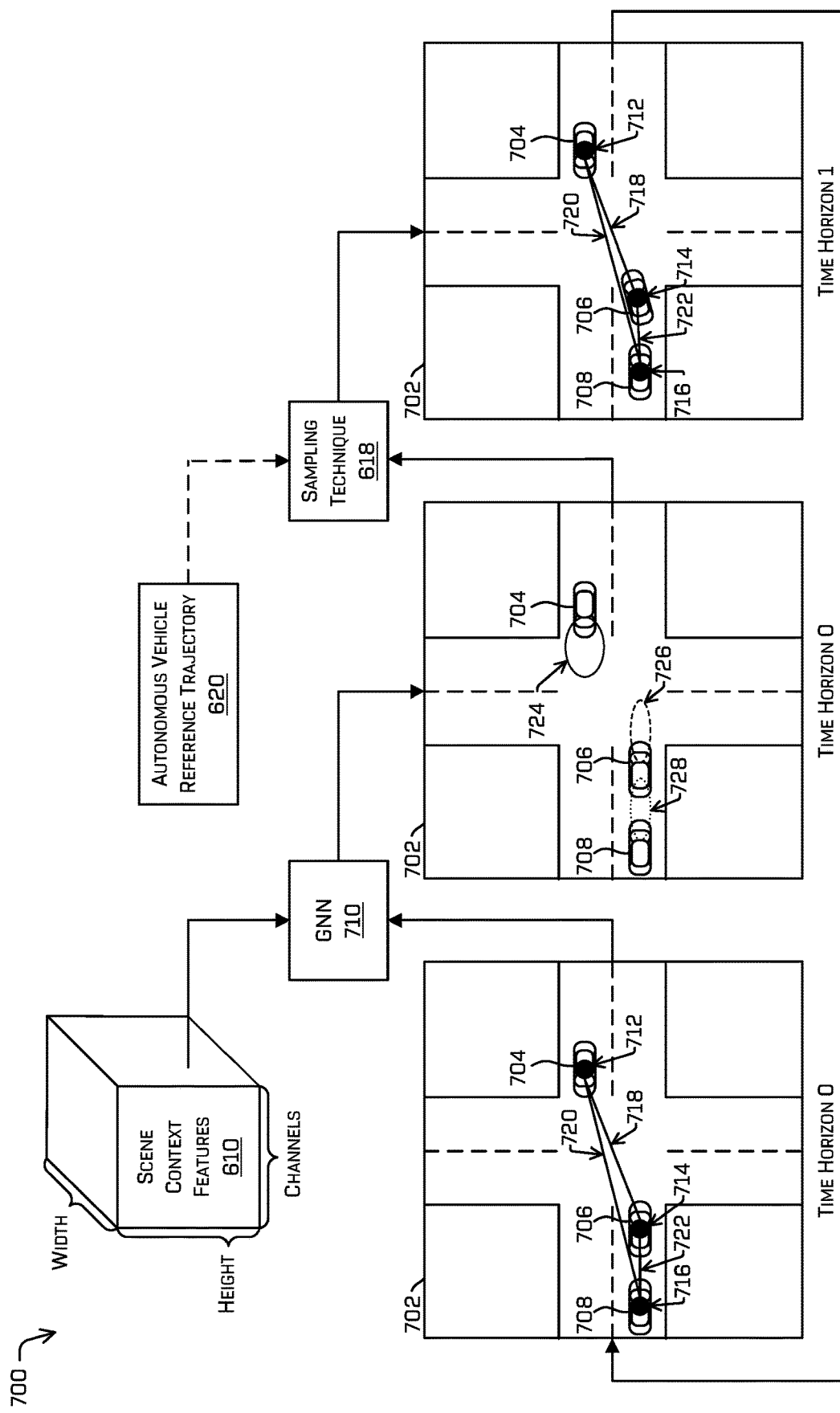
FIG. 7 depicts a block diagram of an example for updating a node of a GNN and sampling a predicted position of an object from distribution data output by the GNN.

FIG. 7 depicts a block diagram of an example 700 for updating a node of a GNN and sampling a predicted position of an object from distribution data output by the GNN at a single time horizon. In some examples, the block diagram illustrated in the example 700 may be configured as a portion of the example architecture 600 as illustrated in FIG. 6.

Take, for example, an environment 702 at a first time horizon (labeled in FIG. 7 as time horizon 0) including a first object 704, a second object 706, and/or a third object 708. Using a graph structure, such as, a graph neural network (GNN), and the techniques described herein, a set of predicted futures associated with the objects may be determined for the environment 702.

At time horizon 0, a first node 712, a second node 714, and a third node 716 of the GNN 710 may be determined and/or updated. In some examples, the first node 712, associated with the first object 704, may be determined using the scene context features 610 corresponding to a position of the first object 704 in the environment 702 and one or more features associated with the first object 704. Additionally, or alternatively, the second node 714, associated with the second object 706, may be determined using the scene context features 610 corresponding to a position of the second object 706 in the environment 702 and one or more features associated with the second object 706. Additionally, or alternatively, the third node 716, associated with the third object 708, may be determined using the scene context features 610 corresponding to a position of the third object 708 in the environment 702 and one or more features associated with the third object 708.

Additionally, at time horizon 0, the GNN 710 may include a first edge 718 connecting the first node 704 and the second node 706, a second edge 720 connecting the first node 704 and the third node 708, and/or a third edge 722 connecting the second node 706 and the third node 708. In some examples, each of the edges 718, 720, and/or 722 may represent a position of an object associated with a node connected to an edge relative to a position of another object associated with another node connected to the edge. In some examples, the edges 718, 720, and/or 722 may be encoded with various features associated with an object as discussed herein and configured as bidirectional edges of the GNN 710. That is, with respect to the first node 712, the first edge 718 may represent a position of the second object 706 relative to a position of the first object 704. Additionally, or alternatively, with respect to the second node 714, the first edge 720 may represent a position of the first object 704 relative to a position of the second object 706.

After updating the GNN 710 with the features associated with the objects 704, 706, and/or 708 and the corresponding scene context features 610 at time horizon 0, the nodes 712, 714, and/or 716 of the GNN 710 may be decoded to determine a first distribution of predicted positions 724 associated with the first object, a second distribution of predicted positions 726 associated with the second object, and/or a third distribution of predicted positions 728 associated with the third object for time horizon 1. In some examples, a predicted position for an object in the future (e.g., at time horizon 1) may be sampled from a distribution of the predicted positions. In some examples, various sampling techniques may be used to sample a distribution of predicted positions, as described with respect to FIGS. 1 and 10. Additionally, or alternatively, a distribution of predicted positions may be evaluated to determine a subset of the predicted positions in the distribution that meet a criterion, prior to the sampling, as described with respect to FIGS. 1 and 11. Additionally, or alternatively, a predicted position of an object sampled from a distribution of predicted positions may be overwritten, as described with respect to FIGS. 1, 2, and 9.

After decoding the nodes of the GNN 710 to determine the distribution of predicted positions 724, 726, and/or 728 of the objects 704, 706, and/or 708 at time horizon 1, a position for each of the objects 704, 706, and/or 708 may be sampled from the distributions, and the nodes 712, 714, and/or 716 may be updated with the features of the objects 704, 706, and/or 708 at time horizon 1 and corresponding the scene context features 610. This process may be repeated for any number of future time horizons. Additionally, or alternatively, a predicted trajectory for each of the objects 704, 706, and/or 708 may be determined based on the predicted positions of the objects at each of the time horizons.

FIGS. 1, 2, and 8-11 illustrate example process(es) in accordance with examples of the disclosure. The process(es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

Figure 8A:
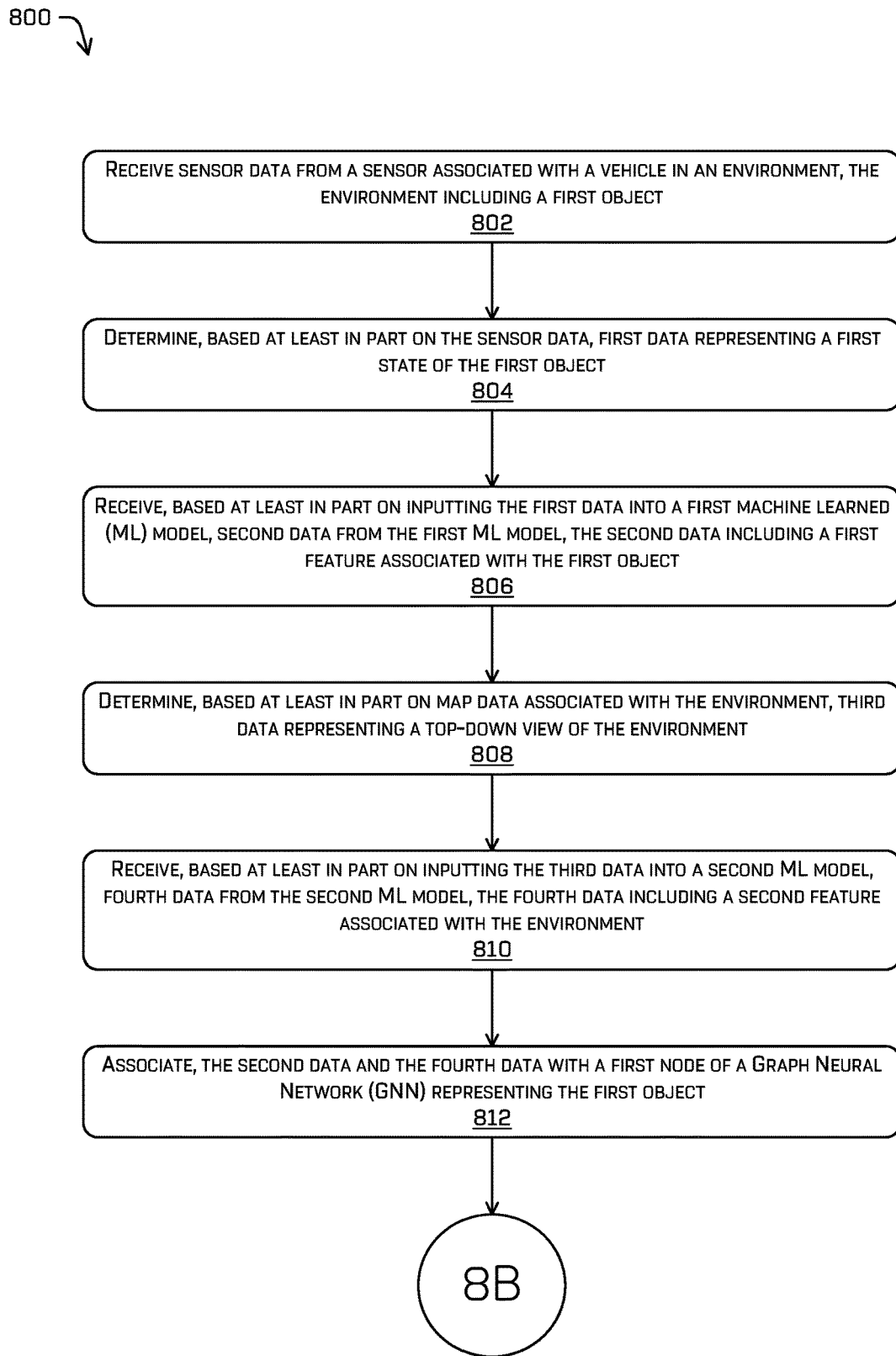
FIGS. 8A and 8B are an example process for capturing sensor data, encoding features into a node and an edge of a GNN and sampling a predicted position of an object from distribution data output by the GNN.
Figure 8B:
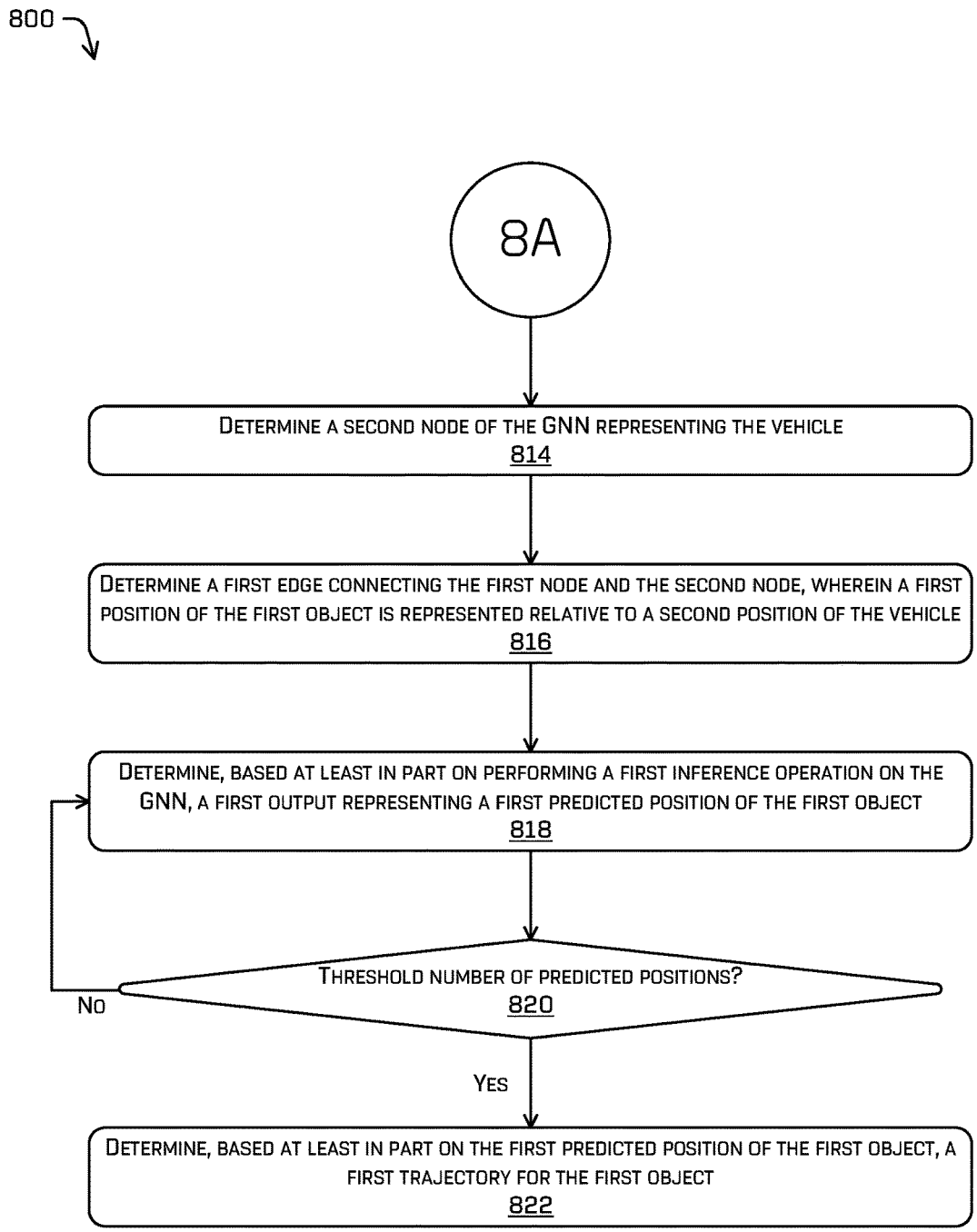

FIGS. 8A and 8B illustrate an example process 800 for capturing sensor data, encoding features into a node and an edge of a GNN and sampling a predicted position of an object from distribution data output by the GNN. In some examples, the sensor data, the node, the edge, the GNN, the predicted position, the object, and/or the distribution data may correspond to the sensor data 108, the node(s) 132, 134, the edge 136, the neural network 142, the predicted position, and/or the object 130 as described with respect to FIG. 1.

The process 800 begins at operation 802 and includes receiving sensor data from a sensor associated with a vehicle in an environment. In some examples, the environment may include a first object.

At operation 804, the process 800 may include determining first data representing a first state of the first object. In some examples, the first data may be determined based at least in part on the sensor data.

At operation 806, the process 800 may include inputting the first data into a first machine learned (ML) model. Additionally, or alternatively, the process 800 may include receiving, based at least in part on inputting the first data into the first ML model, second data from the first ML model including a first feature associated with the first object. In some examples, the first ML model may be configured as a recurrent neural network (RNN).

At operation 808, the process 800 may include determining third data representing a top-down view of the environment. In some examples, the third data may be determined based at least in part on map data associated with the environment. In some examples, the map data may be received from a map server associated with the vehicle.

At operation 810, the process 800 may include inputting the third data into a second ML model. Additionally, or alternatively, the process 800 may include receiving, based at least in part on inputting the third data into the second ML model, fourth data including a second feature associated with the environment. In some examples, the second ML model may be different from the first ML model. Additionally, or alternatively, the second ML model may be configured as an RNN or a convolution neural network (CNN).

At operation 812, the process 800 may include associating the second data and the fourth data with a first node of a Graph Neural Network (GNN) representing the first object.

At operation 814, the process 800 may include determining a second node of the GNN representing the vehicle.

At operation 816, the process 800 may include determining a first edge connecting the first node and the second node. In some examples, a first position of the first object is represented relative to a second position of the vehicle in the first edge.

At operation 818, the process 800 may include performing a first inference operation on the GNN. Additionally, or alternatively, the process 800 may include determining, based at least in part on the first inference operation, a first output representing first distribution data for the first object. In some examples, the first distribution data may include first predicted positions for the first object. Additionally, or alternatively, the process may include determining a first predicted position of the first object based on the first inference operation.

At operation 820, the process 800 may include determining whether a threshold amount of predicted positions for the first object have been determined. For example, a predicted trajectory for the first object may be determined using one or more predicted positions for the first object. By way of example, the operation 820 may include determining that a threshold amount of predicted positions have been determined to determine a predicted trajectory. By way of another example, the operation 820 may include determining that a threshold amount of predicted positions have not been determined to determine a predicted trajectory. The process may subsequently include the operation 818 to restart a portion of the process 800 (at a subsequent timestep), based on determining that a threshold amount of predicted positions have not been determined to determine a predicted trajectory.

At operation 822, the process 800 may include determining a first trajectory for the first object. In some examples, determining the first trajectory for the first object may be based at least in part on the first predicted position of the first object.

In some examples, the vehicle is an autonomous vehicle traversing the environment. Additionally, or alternatively, the process 800 may include controlling the autonomous vehicle based at least in part on the first trajectory for the first object.

Additionally, or alternatively, the process 800 may include determining, based at least in part on the sensor data, fifth data representing a second state of a second object in the environment. Additionally, or alternatively, the process 800 may include receiving, based at least in part on inputting the fifth data into the second ML model, sixth data including a third feature associated with the second object. Additionally, or alternatively, the process 800 may include associating the fourth data and the sixth data with a third node of the GNN representing the second object. Additionally, or alternatively, the process 800 may include determining a second edge connecting the first node and the third node, wherein a third position of the second object is represented relative to the first position of the first object. Additionally, or alternatively, the process 800 may include determining a third edge connecting the second node and the third node, wherein the third position of the second object is represented as a relative position with respect to the second position of the vehicle. Additionally, or alternatively, the process 800 may include performing a second inference operation on the GNN. Additionally, or alternatively, the process 800 may include determining, based at least in part on the second inference operation, a second output representing second distribution data for the second object, the second distribution data including second predicted positions for the second object. Additionally, or alternatively, the process 800 may include determining, based at least in part on sampling from the second distribution data, a second predicted position of the second object. Additionally, or alternatively, the process 800 may include determining, based at least in part on the first predicted position of the first object and the second predicted position of the second object, the first trajectory for the first object and a second trajectory for the second object.

In some examples, the first position of the first object may be associated with a first time. Additionally, or alternatively, the first predicted position of the first object may be associated with a second time that is subsequent to the first time. Additionally, or alternatively, the process 800 may include updating the first node of the GNN representing the first object based at least in part on the fourth data and the first predicted position of the first object, wherein the first predicted position of the first object is represented relative to the second position of the vehicle. Additionally, or alternatively, the process 800 may include performing a second inference operation on the GNN. Additionally, or alternatively, the process 800 may include determining, based at least in part on the second inference operation, a second output representing second distribution data for the first object, the second distribution data including second predicted positions for the first object. Additionally, or alternatively, the process 800 may include determining, based at least in part on sampling from the second distribution data, a second predicted position of the first object at a third time that is subsequent to the second time. In some examples, determining the first trajectory for the first object may be based at least in part on the first predicted position of the first object and/or the second predicted position of the first object.

In some examples, the first data may include a second state of a second object in the environment.

Additionally, or alternatively, the process 800 may include determining, based at least in part on sampling from second distribution data including second predicted positions for the second object, a second predicted position of the second object. In some examples, determining the first trajectory for the first object may be based at least in part on the first predicted position of the first object and the second predicted position of the second object.

Additionally, or alternatively, the process 800 may include determining the first feature associated with the object based at least in part on data representing at least one of a pose of the object, a position of the object, an acceleration of the object, a speed of the object, a size of the object, a type of the object, and/or a lighting state of the object.

Additionally, or alternatively, the process 800 may include determining the second feature associated with the environment based at least in part on data representing at least one of an additional object in the environment, a type of the additional object in the environment, a lighting state of the additional object in the environment, and/or a lane marking in the environment.

Figure 9:
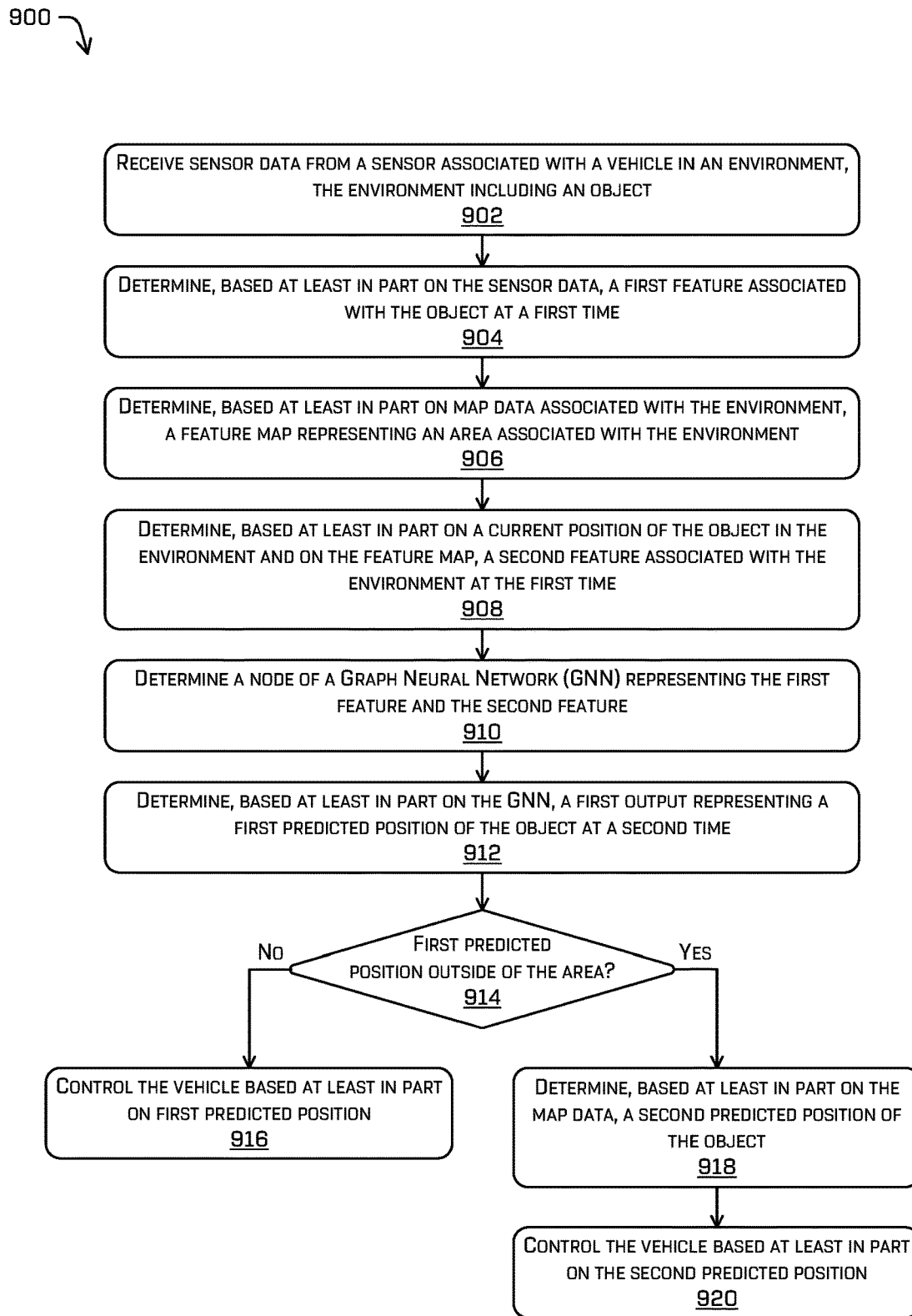
FIG. 9 is an example process for capturing sensor data, encoding features into a node and an edge of a GNN, determining that a first predicted position of an object sampled from distribution data output by the GNN is outside of a specified area, and determining a second predicted position of the object based on map data.

FIG. 9 is an example process 900 for capturing sensor data, encoding features into a node and an edge of a GNN, determining that a first predicted position of an object sampled from distribution data output by the GNN is outside of a specified area, and determining a second predicted position of the object based on map data. In some examples, the sensor data, the node, the GNN, the first predicted position, the specified area, the second predicted position, the map data, the object, and/or the distribution data may correspond to the sensor data 208, the node 228, the graph structure 226, the first predicted position 246, the area 240, the second predicted position 250, the map data, the object 242, and/or the distribution data 244 as described with respect to FIG. 2.

The process 900 begins at operation 902 and includes receiving sensor data from a sensor associated with a vehicle in an environment. In some examples, the environment may include an object.

At operation 904, the process 900 may include determining a first feature associated with the object. In some examples, the first feature may be determined based at least in part on the sensor data. Additionally, or alternatively, the process 900 may include determining a first state of the object, inputting the first state of the object into a first machine learned (ML) model, and/or receiving, based at least in part on inputting the first state of the object into the first ML model, the first feature data associated with the object. In some examples, the first ML model may be configured as a recurrent neural network (RNN).

At operation 906, the process 900 may include determining a feature map representing an area associated with the environment. In some examples, the feature map may be determined based at least in part on map data associated with the environment. In some examples, the feature map may correspond to the feature map 218 as described with respect to FIG. 2.

At operation 908, the process 900 may include determining a second feature associated with the environment. In some examples, the second feature may be based at least in part on a current position of the object in the environment and on the feature map. Additionally, or alternatively, the process 900 may include determining a top-down view of the environment, inputting the top-down view into a second ML model, and/or receiving, based at least in part on inputting the top-down view of the of the environment into the second ML model, the second feature data. In some examples, the second ML model may be different from the first ML model. Additionally, or alternatively, the second ML model may be configured as an RNN or a convolution neural network (CNN).

At operation 910, the process 900 may include determining a node of a Graph Neural Network (GNN) representing the first feature and the second feature.

At operation 912, the process 900 may include determining a first output representing first distribution data associated with the object. In some examples, the first output may be based at least in part on the GNN. Additionally, or alternatively, the first distribution data may include first predicted positions for the object in the future. Additionally, or alternatively, the first output may represent a first predicted position of the object in the future.

At operation 914, the process 900 may include determining whether the first predicted position is outside of the area of the environment. By way of example, the operation 914 may include determining that the first predicted position is inside of the area of the environment. The process 900 may then subsequently include the operation 916, based on determining that the first predicted position is inside of the area of the environment. By way of another example, the operation 914 may include determining that the first predicted position is outside of the area of the environment. The process 900 may then subsequently include the operation 918, based on determining that the first predicted position is outside of the area of the environment.

At operation 916, the process 900 may include controlling the vehicle based at least in part on the first predicted position.

At operation 918, the process 900 may include determining a second predicted position of the object. In some examples, the second predicted position of the object may be based at least in part on the first predicted position being outside the area and/or the map data.

At operation 920, the process 900 may include controlling the vehicle based at least in part on the second predicted position.

Additionally, or alternatively, the process 900 may include determining the first predicted position based at least in part on sampling from the first distribution data.

Additionally, or alternatively, the process 900 may include determining, based at least in part on the current position of the object in the environment and the map data, a reference line. In some examples, determining the second predicted position of the object may be based at least in part on projecting the first predicted position onto the reference line.

Additionally, or alternatively, the process 900 may include determining that the second predicted position of the object in the environment is outside of the area associated with the feature map. Additionally, or alternatively, the process 900 may include determining, based at least in part on the second predicted position of the object being outside of the area, a third feature associated with the environment, wherein the third feature is a null feature. Additionally, or alternatively, the process 900 may include updating the node of the GNN based at least in part on the third feature. Additionally, or alternatively, the process 900 may include determining, based at least in part on the GNN, a second output representing second distribution data associated with the object, the second distribution data including second predicted positions for the object. Additionally, or alternatively, the process 900 may include determining, based at least in part on the second distribution set, that a third predicted position of the object is outside of the area of the environment. Additionally, or alternatively, the process 900 may include determining, based at least in part on the map data, a fourth predicted position of the object. Additionally, or alternatively, the process 900 may include controlling the vehicle based at least in part on the second predicted position of the object and the fourth predicted position of the object.

In some examples, a first distance between the current position of the object in the environment and the first predicted position of the object may be the same as a second distance between the current position of the object in the environment and the second predicted position of the object In some examples, determining the second predicted position of the object may be based at least in part on a vehicle dynamics model.

In some examples, the area may be a bounded area, and a portion of the feature map corresponding to the bounded area may be used for planning a trajectory of a vehicle through the environment.

Figure 10:
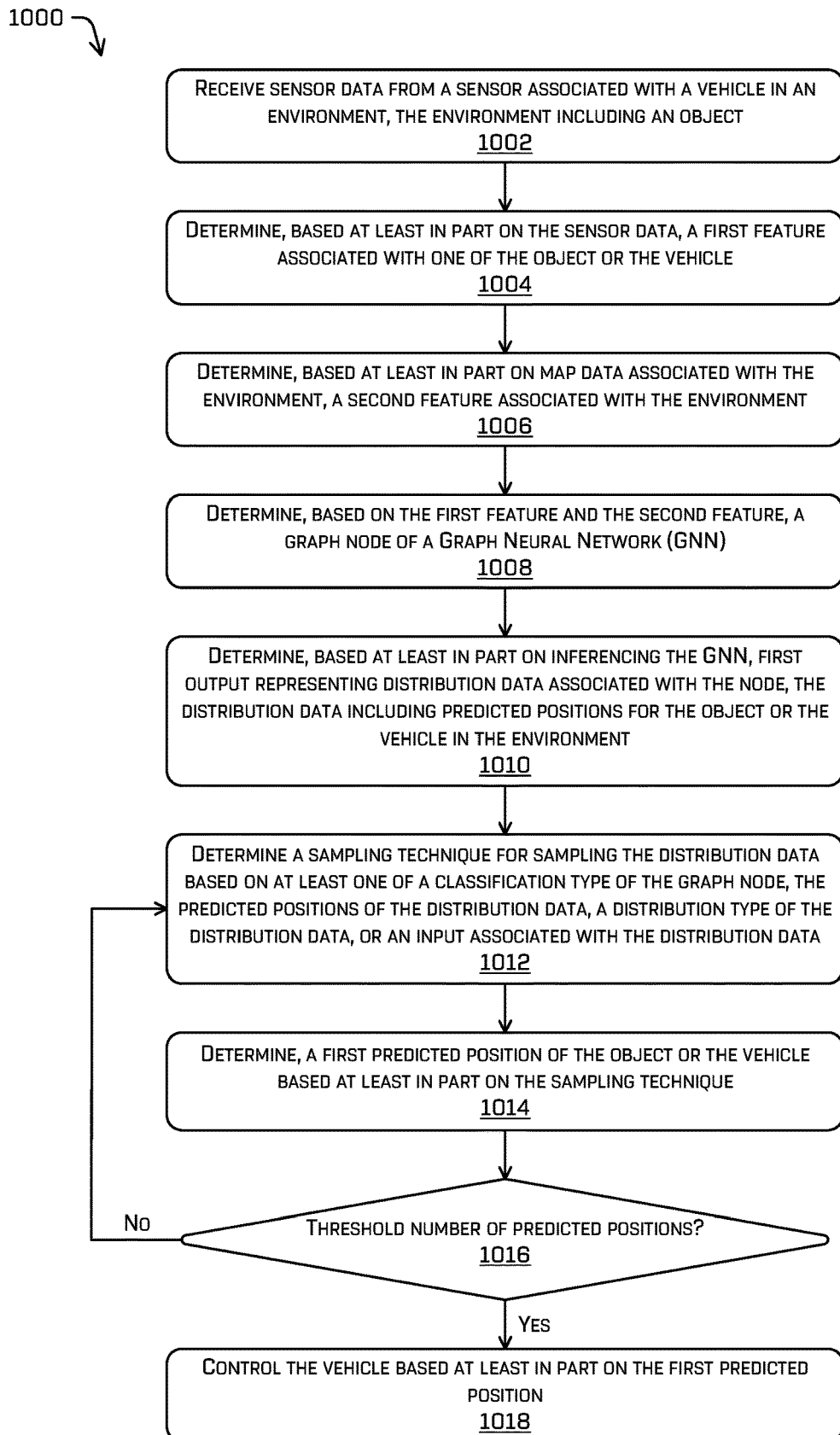
FIG. 10 is an example process for capturing sensor data, encoding features into a node and an edge of a GNN, determining a sampling technique for sampling distribution data output by the GNN, and controlling a vehicle based on a predicted position of an object sampled from the distribution data using the sampling technique.

FIG. 10 is an example process 1000 for capturing sensor data, encoding features into a node and an edge of a GNN, determining a sampling technique for sampling distribution data output by the GNN, and controlling a vehicle based on a predicted position of an object sampled from the distribution data using the sampling technique. In some examples, the sensor data, the node, the edge, the GNN, the predicted position, the object, and/or the distribution data may correspond to the sensor data 108, the node(s) 132, 134, the edge 136, the neural network 142, the predicted position, the object 130, and/or the predicted position distribution 146 as described with respect to FIG. 1.

The process 1000 begins at operation 1002 and includes receiving sensor data from a sensor associated with a vehicle in an environment. In some examples, the environment may include an object.

At operation 1004, the process 1000 may include determining a first feature associated with one of the object or the vehicle. In some examples, the first feature may be based at least in part on the sensor data. Additionally, or alternatively, the process 1000 may include determining a first state of the object or the vehicle, inputting the first state of the object or the vehicle into a first machine learned (ML) model, and/or receiving, based at least in part on inputting the first state of the object or the vehicle into the first ML model, the first feature associated with the object or the vehicle. In some examples, the first ML model may be configured as a recurrent neural network (RNN).

At operation 1006, the process 1000 may include determining a second feature associated with the environment. In some examples, the second feature associated with the environment may be based at least in part on map data associated with the environment. Additionally, or alternatively, the process 1000 may include determining a top-down view of the environment, inputting the top-down view into a second ML model, and/or receiving, based at least in part on inputting the top-down view of the of the environment into the second ML model, the second feature data. In some examples, the second ML model may be different from the first ML model. Additionally, or alternatively, the second ML model may be configured as an RNN or a convolution neural network (CNN).

At operation 1008, the process 1000 may include determining a graph node of a Graph Neural Network (GNN). In some examples, the graph node may be based on the first feature and the second feature.

At operation 1010, the process 1000 may include determining first output representing distribution data associated with the node. In some examples, the first output may be based at least in part on inferencing the GNN. Additionally, or alternatively, the distribution data including predicted positions for the object or the vehicle in the environment.

At operation 1012, the process 1000 may include determining a sampling technique for sampling the distribution data. In some examples, the sampling technique may be based at least in part on a classification type of the graph node, the predicted positions of the distribution data, a distribution type of the distribution data, and/or an input associated with the distribution data.

At operation 1014, the process 1000 may include determining a first predicted position of the object or the vehicle based at least in part on the sampling technique.

At operation 1016, the process 1000 may include determining whether a threshold amount of predicted positions have been sampled from the distribution data. For example, a predicted trajectory for the object may be determined using one or more predicted positions for the object. By way of example, the operation 1016 may include determining that a threshold amount of predicted positions have been sampled from the distribution data to determine a predicted trajectory. By way of another example, the operation 1016 may include determining that a threshold amount of predicted positions have not been sampled from the distribution data to determine a predicted trajectory. The process may subsequently include the operation 1012 to restart a portion of the process 1000 (at a subsequent timestep), based on determining that a threshold amount of predicted positions have not been sampled from the distribution data to determine a predicted trajectory.

At operation 1018, the process 1000 may include controlling the vehicle based at least in part on the first predicted position of the object.

Additionally, or alternatively, the process 1000 may include determining that the classification type of the graph node indicates that the graph node is associated with the object, wherein the sampling technique comprises a first sampling technique. Additionally, or alternatively, the process 1000 may include determining that the classification type of the graph node indicates that the graph node is associated with the vehicle, wherein the sampling technique comprises a second sampling technique that is different from the first sampling technique.

Additionally, or alternatively, the process 1000 may include determining a bounded area of the environment used for planning a trajectory of the vehicle. Additionally, or alternatively, the process 1000 may include determining, based at least in part on the distribution data, that the predicted positions of the distribution data are outside of the bounded area. Additionally, or alternatively, the process 1000 may include determining the sampling technique based at least in part on the predicted positions of the distribution data being outside of the bounded area. Additionally, or alternatively, the process 1000 may include determining, based at least in part on the sampling technique and map data associated with the environment, the first predicted position of the object.

Additionally, or alternatively, the process 1000 may include determining that the distribution type of the distribution data is a first distribution type. Additionally, or alternatively, the process 1000 may include determining, based at least in part on sampling the distribution data using the sampling technique, the first predicted position of the object or the vehicle, wherein the sampling technique comprises a Gaussian sampling technique. Additionally, or alternatively, the process 1000 may include determining that the distribution type of the distribution data is a second distribution type. Additionally, or alternatively, the process 1000 may include determining, based at least in part on sampling the distribution data using the sampling technique, the first predicted position of the object or the vehicle. In some examples, the first predicted position may be an average of the predicted positions of the distribution data.

In some examples, the vehicle may be an autonomous vehicle. Additionally, or alternatively, the process 1000 may include receiving, from a planning component of the autonomous vehicle, the input data, wherein the first predicted position of the object or the vehicle is based at least in part on the input data. In some examples, the input data may include a reference trajectory for the autonomous vehicle through the environment.

Additionally, or alternatively, the process 1000 may include receiving the input data, wherein the input data indicates a selected position for the object or the vehicle in the environment that is different from the predicted position. Additionally, or alternatively, the process 1000 may include determining the predicted trajectory for the object or the vehicle based on the selected position.

In some examples, the sampling technique may be a first sampling technique and/or the first predicted position may be associated with a first time. Additionally, or alternatively, the process 1000 may include updating, based at least in part on the first predicted position of the object or the vehicle, the graph node with a third feature associated with the environment. Additionally, or alternatively, the process 1000 may include determining, based at least in part on the graph structure, second output representing the distribution data associated with the node, the distribution data including predicted positions for the object or the vehicle in the environment at a second time that is after the first time. Additionally, or alternatively, the process 1000 may include determining a second sampling technique for sampling the distribution data, wherein the second sampling technique is different from the first sampling technique. Additionally, or alternatively, the process 1000 may include determining a second predicted position of the object or the vehicle in the environment at the second time based at least in part on the second sampling technique. Additionally, or alternatively, the process 1000 may include determining the predicted trajectory based at least in part on the first predicted position and the second predicted position.

In some examples, the node may be a first node associated with the object, the distribution data may be first distribution data associated with the first node at a first time, and the sampling technique may be a first sampling technique. Additionally, or alternatively, the process 1000 may include associating a third feature associated with the vehicle and the second feature associated with the environment with a second node of the graph structure. Additionally, or alternatively, the process 1000 may include determining, based at least in part on the graph structure, second output representing second distribution data associated with the second node, the second distribution data include second predicted positions for the vehicle in the environment at the first time.

Additionally, or alternatively, the process 1000 may include determining the first sampling technique for sampling the first distribution data based at least in part on the classification type of the first node. Additionally, or alternatively, the process 1000 may include determining a second sampling technique for sampling the second distribution data based at least in part on a first classification type of the second node, wherein the second sampling technique is different from the first sampling technique. Additionally, or alternatively, the process 1000 may include determining a second predicted position of the vehicle at the first time based at least in part on the second sampling technique. Additionally, or alternatively, the process 1000 may include determining the predicted trajectory for the object or the vehicle based at least in part on the first predicted position or the second predicted position.

Figure 11:
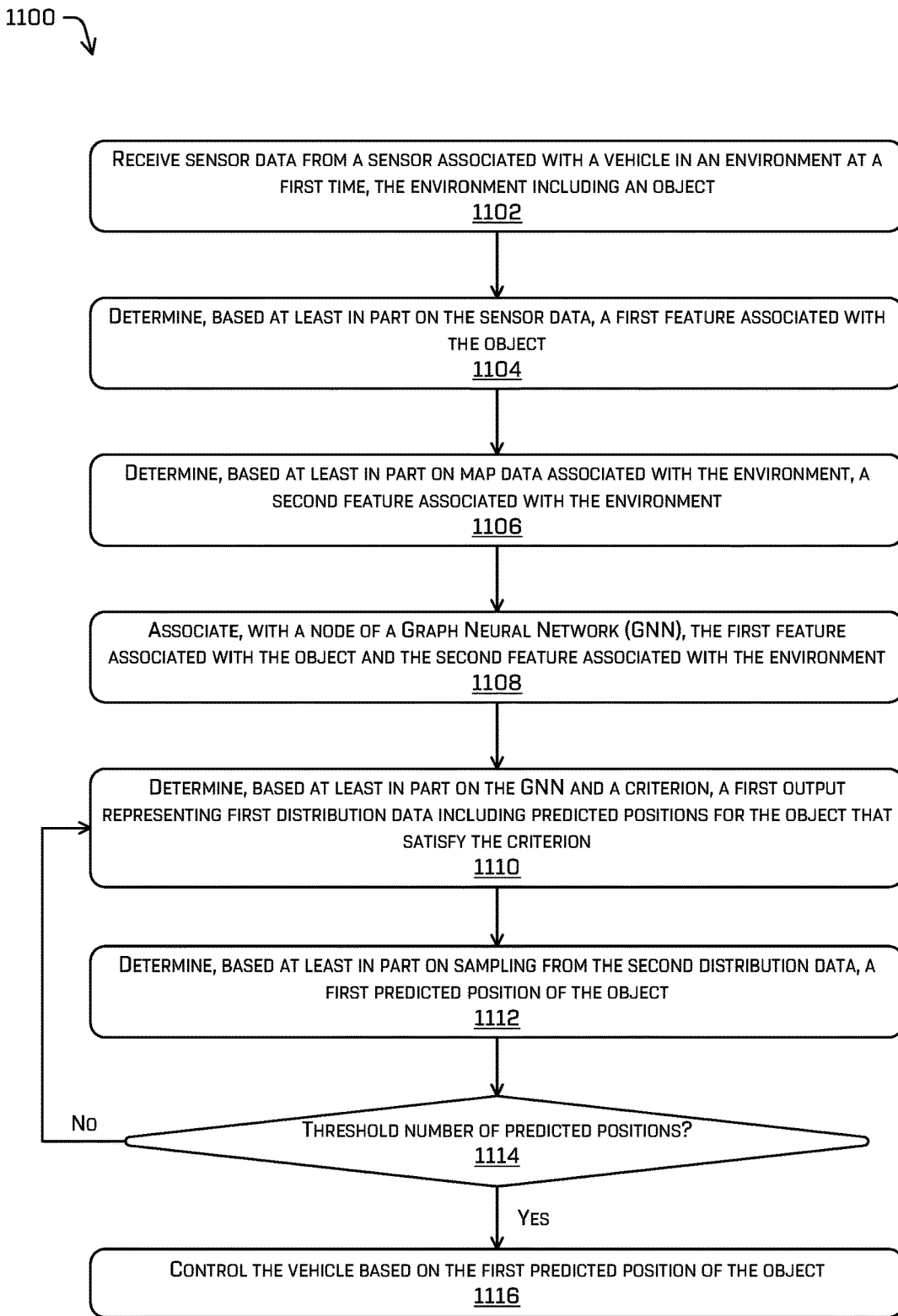
FIG. 11 is an example process for capturing sensor data, encoding features into a node and an edge of a GNN, evaluating first distribution data output by the GNN to determine second distribution data including a subset of predicted positions included in the first distribution data that meet a criterion, and controlling a vehicle based on a predicted position of an object sampled from the second distribution data.

FIG. 11 is an example process 1100 for capturing sensor data, encoding features into a node and an edge of a GNN, evaluating first distribution data output by the GNN to determine second distribution data including a subset of predicted positions included in the first distribution data that meet a criterion, and controlling a vehicle based on a predicted position of an object sampled from the second distribution data. In some examples, the sensor data, the node, the edge, the GNN, the predicted position, the object, the criterion, the first distribution data and/or the second distribution data may correspond to the sensor data 108, the node(s) 132, 134, the edge 136, the neural network 142, the predicted position, the object 130, the criterion, the distribution data, and/or the subset of the distribution data as described with respect to FIG. 1.

The process 1100 begins at operation 1102 and includes receiving sensor data from a sensor associated with a vehicle in an environment at a first time. In some examples, the environment may include an object.

At operation 1104, the process 1100 may include determining a first feature associated with the object. In some examples, the first feature may be based at least in part on the sensor data. Additionally, or alternatively, the process 1100 may include determining a first state of the object, inputting the first state of the object into a first machine learned (ML) model, and/or receiving, based at least in part on inputting the first state of the object into the first ML model, the first feature data associated with the object. In some examples, the first ML model may be configured as a recurrent neural network (RNN).

At operation 1106, the process 1100 may include determining a second feature associated with the environment. In some examples, the second feature may be based at least in part on the sensor data. Additionally, or alternatively, the process 1100 may include determining a top-down view of the environment, inputting the top-down view into a second ML model, and/or receiving, based at least in part on inputting the top-down view of the of the environment into the second ML model, the second feature data. In some examples, the second ML model may be different from the first ML model. Additionally, or alternatively, the second ML model may be configured as an RNN or a convolution neural network (CNN).

At operation 1108, the process 1100 may include associating, with a node of a Graph Neural Network (GNN), the first feature associated with the object and the second feature associated with the environment.

At operation 1110, the process 1100 may include determining a first output representing first distribution data including predicted positions that the object will be at in the environment at a second time after the first time. In some examples, the first output may be determined based at least in part on the GNN and/or a criterion. In some examples, the first distribution data may include only predicted positions that satisfy the criterion.

At operation 1112, the process 1100 may include determining a first predicted position of the object. In some examples, the first predicted position of the object may be based at least in part on sampling from the second distribution data.

At operation 1114, the process 1100 may include determining whether a threshold amount of predicted positions have been determined. For example, a predicted position for the first object may be determined based on sampling from distribution data and one or more predicted positions may be used to determine a trajectory for the first object. By way of example, the operation 1114 may include determining that a threshold amount of predicted positions have been determined. By way of another example, the operation 1114 may include determining that a threshold amount of predicted positions have not been determined. The process 1100 may subsequently include the operation 1110 to restart a portion of the process 1100 (at a subsequent timestep), based on determining that a threshold amount of predicted positions are not included in the second distribution data.

At operation 1116, the process 1100 may include controlling the vehicle based on the first predicted position of the object.

In some examples, the sensor is associated with an autonomous vehicle traversing the environment. Additionally, or alternatively, the process 1100 may include receiving, from a planning component associated with the autonomous vehicle, a trajectory of the vehicle through the environment. Additionally, or alternatively, the process 1100 may include determining the criterion based at least in part on the trajectory of the autonomous vehicle.

Additionally, or alternatively, the process 1100 may include determining, based at least in part on the first feature associated with the object and the second feature associated with the environment, an intent associated with the object. Additionally, or alternatively, the process 1100 may include determining the criterion based at least in part on the intent associated with the object.

Additionally, or alternatively, the process 1100 may include receiving the map data associated with the environment. Additionally, or alternatively, the process 1100 may include determining, based at least in part on the map data and the sensor data, a rule associated with the environment. In some examples, the rule may include at least one of a stop sign, a streetlight, a zone in the environment, and/or a speed limit. In some examples, the zone in the environment may be a defined zone (e.g., a school zone at specific times of the day, long-term highway construction zones, etc.) and/or an undefined zone (e.g., a construction zone that is established or removed at an unspecified time that can be signified by signage, the presence of a traffic-directing worker, etc.). Additionally, or alternatively, the process 1100 may include determining the criterion based at least in part on the rule associated with the environment.

In some examples, the criterion may be based at least in part on the object characteristic associated with the object. In some examples, the object characteristic including at least one of a maximum turning radius associated with the object, a maximum speed associated with the object, a maximum acceleration associated with the object, a lane change maneuver associated with the object, a turn maneuver associated with the object, and/or an adverse behavior maneuver associated with the object.

Additionally, or alternatively, the process 1100 may include determining the criterion based at least in part on the first feature of the object. In some examples, the first feature includes at least one of a current pose of the object, a current position of the object, a current acceleration of the object, a current speed of the object, a size of the object, a type of the object, and/or a lighting state of the object.

In some examples, the object may be a first object, the predicted positions may be first predicted positions, and the criterion may be a first criterion. Additionally, or alternatively, the process 1100 may include determining, based at least in part on the sensor data, a third feature associated with a second object in the environment. Additionally, or alternatively, the process 1100 may include associating the third feature associated with the second object and the second feature associated with the environment with a second node of the graph structure. Additionally, or alternatively, the process 1100 may include determining, based at least in part on the graph structure, second output representing third distribution data for the second object, the third distribution data including second predicted positions for the second object in the future. Additionally, or alternatively, the process 1100 may include determining a second criterion based at least in part on the first predicted position of the first object. Additionally, or alternatively, the process 1100 may include evaluating the third distribution data to determine which of the second predicted positions in the third distribution data meet the second criterion. Additionally, or alternatively, the process 1100 may include determining, based at least in part on evaluating the third distribution data for the second object, fourth distribution data for the second object, the fourth distribution data including a second subset of the second predicted positions for the second object. Additionally, or alternatively, the process 1100 may include determining, based at least in part on sampling from the fourth distribution set, a second predicted position of the second object. Additionally, or alternatively, the process 1100 may include determining, based at least in part on the second predicted position of the second object and the first predicted trajectory of the first object, a second predicted trajectory of the second object.

In some examples, the vehicle is an autonomous vehicle traversing the environment. Additionally, or alternatively, the process 1100 may include determining, based at least in part on the first predicted trajectory of the first object and the second predicted trajectory of the second object, a third predicted trajectory for the autonomous vehicle. Additionally, or alternatively, the process 1100 may include controlling the autonomous vehicle based at least in part on the third predicted trajectory.

Figure 12:
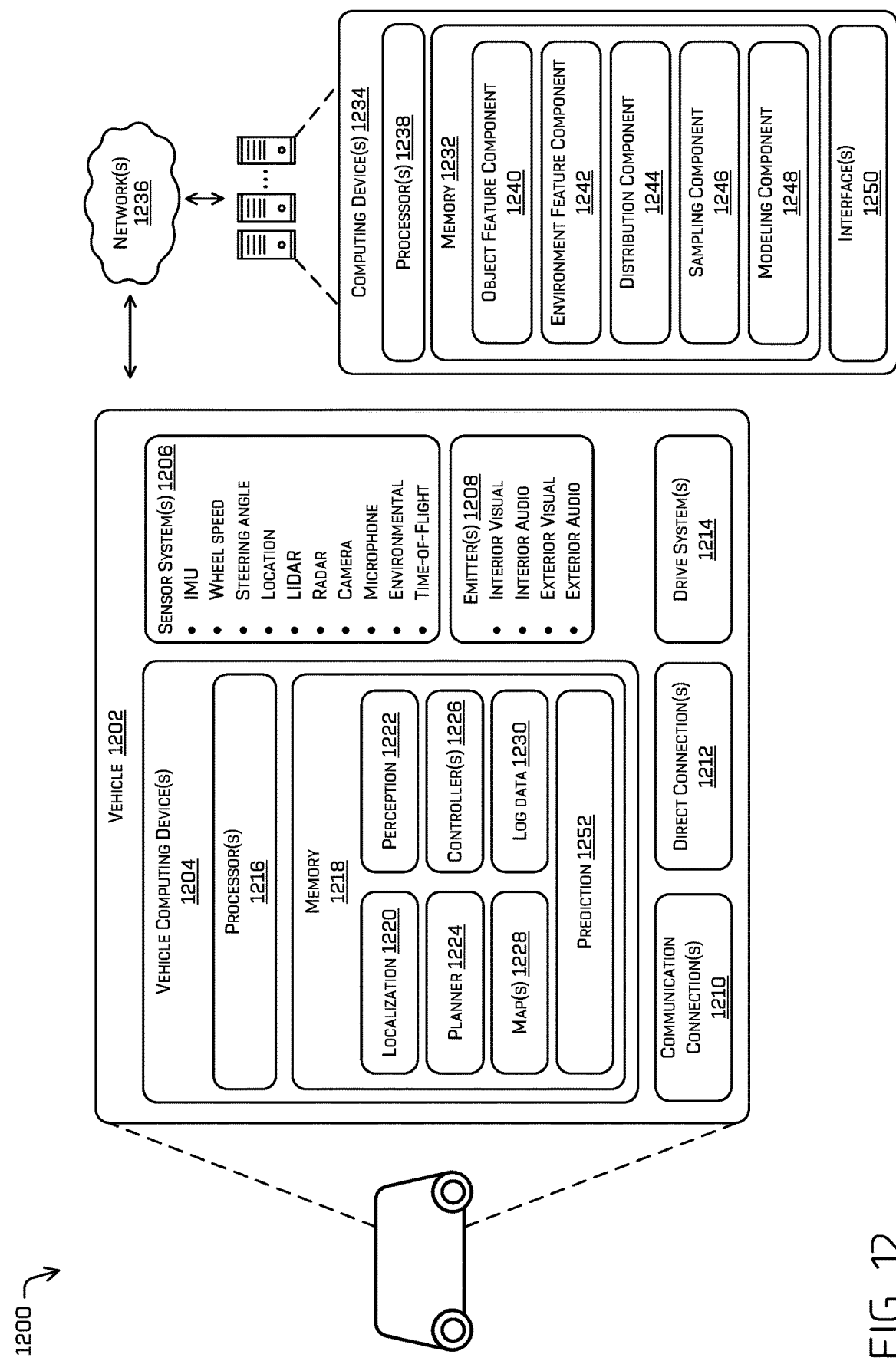
FIG. 12 is a block diagram of an example system for implementing the techniques described herein.

FIG. 12 is a block diagram of an example system 1200 for implementing the techniques described herein. In at least one example, the system 1200 may include a vehicle 1202, such as vehicle 106.

The vehicle 1202 may include a vehicle computing device 1204, one or more sensor systems 1206, one or more emitters 1208, one or more communication connections 1210, at least one direct connection 1212, and one or more drive systems 1214.

The vehicle computing device 1204 may include one or more processors 1216 and memory 1218 communicatively coupled with the one or more processors 1216. In the illustrated example, the vehicle 1202 is an autonomous vehicle; however, the vehicle 1202 could be any other type of vehicle, such as a semi-autonomous vehicle, or any other system having at least an image capture device (e.g., a camera enabled smartphone). In the illustrated example, the memory 1218 of the vehicle computing device 1204 stores a localization component 1220, such as localization component 1220, a perception component 1222, a planner component 1224, one or more system controllers 1226, one or more maps 1228, log data 1230, and a prediction component 1252. Though depicted in FIG. 12 as residing in the memory 1218 for illustrative purposes, it is contemplated that the localization component 1220, the perception component 1222, the planner component 1224, the system controller(s) 1226, the map(s) 1228, and the prediction component 1252 may additionally, or alternatively, be accessible to the vehicle 1202 (e.g., stored on, or otherwise accessible by, memory remote from the vehicle 1202, such as, for example, on memory 1232 of a computing device 1234). As described herein, the localization component 1220, the perception component 1222, the planner component 1224, the system controller(s) 1226, and the prediction component 1252 may be collectively comprise a vehicle controller.

In at least one example, the localization component 1220 may include functionality to receive data from the sensor system(s) 1206 to determine a position and/or orientation of the vehicle 1202 (e.g., one or more of an x-, y-, z-position, roll, pitch, or yaw). For example, the localization component 1220 may include and/or request/receive a map of an environment and may continuously determine a location and/or orientation of the autonomous vehicle within the map. In some instances, the localization component 1220 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 1220 may provide data to various components of the vehicle 1202 to determine an initial position of an autonomous vehicle for generating a path polygon associated with the vehicle path, as discussed herein.

In some instances, the perception component 1222 may include functionality to perform object detection, segmentation, and/or classification. In some examples, the perception component 1222 may provide processed sensor data that indicates a presence of an object (e.g., entity) that is proximate to the vehicle 1202 and/or a classification of the object as an object type (e.g., car, pedestrian, cyclist, animal, building, tree, road surface, curb, sidewalk, unknown, etc.). In some examples, the perception component 1222 may provide processed sensor data that indicates a presence of a stationary entity that is proximate to the vehicle 1202 and/or a classification of the stationary entity as a type (e.g., building, tree, road surface, curb, sidewalk, unknown, etc.).

In additional or alternative examples, the perception component 1222 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

The prediction component 1252 may generate one or more probability maps representing prediction probabilities of possible locations of one or more objects in an environment. For example, the prediction component 1252 may generate one or more probability maps for vehicles, pedestrians, animals, and the like within a threshold distance from the vehicle 1202. In some examples, the prediction component 1252 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment.

In general, the planner component 1224 may determine a path for the vehicle 1202 to follow to traverse through an environment. For example, the planner component 1224 may determine various routes and trajectories and various levels of detail. For example, the planner component 1224 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 1224 may generate an instruction for guiding the vehicle 1202 along at least a portion of the route from the first location to the second location. In at least one example, the planner component 1224 may determine how to guide the vehicle 1202 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 1202 to navigate.

In some examples, the planner component 1224 may be communicatively coupled to the prediction component 1252 to generate predicted trajectories of objects in an environment. For example, the prediction component 1252 may generate one or more predicted trajectories for objects within a threshold distance from the vehicle 1202. In some examples, the prediction component 1252 may measure a trace of an object and generate a trajectory for the object based on observed and predicted behavior.

In at least one example, the vehicle computing device(s) 1204 may include one or more system controllers 1226, which may be configured to control steering, propulsion, braking, safety, emitters, communication, and other systems of the vehicle 1202. The system controller(s) 1226 may communicate with and/or control corresponding systems of the drive system(s) 1214 and/or other components of the vehicle 1202.

The memory 1218 may further include one or more maps 1228 that may be used by the vehicle 1202 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 1202 may be controlled based at least in part on the maps 1228. That is, the maps 1228 may be used in connection with the localization component 1220, the perception component 1222, and/or the planner component 1224 to determine a location of the vehicle 1202, detect objects in an environment, and/or generate routes and/or trajectories to navigate within an environment. Additionally, in some examples, the maps 1228 may be used in connection with a tracker component to determine a position and/or orientation of the vehicle with respect to a planned trajectory, such as based on steering angles, velocities, accelerations, drive direction, drive gear, and/or gravity acceleration.

In some examples, the one or more maps 1228 may be stored on a computing device(s) (such as the computing device(s) 1234) accessible via network(s) 1236. In some examples, multiple maps 1228 may be stored based on, for example, a characteristic (e.g., type of entity, time of day, day of week, season of the year, etc.). Storing multiple maps 1228 may have similar memory requirements, but increase the speed at which data in a map may be accessed.

As illustrated in FIG. 7, the memory 1218 may store log data 1230. The log data 1230 may represent data input and/or output by each of the localization component 1220, the perception component 1222, the planner component 1224, the controller(s) 1226, and/or outputs of various subcomponents thereof. In at least one example the log data 1230 may include sensor data captured and provided to one or more of the components of the vehicle computing device(s) 1204 by the sensor systems 1206.

As can be understood, the components discussed herein (e.g., the localization component 1220, the perception component 1222, the planner component 1224, the one or more system controllers 1226, and the one or more maps 1228 are described as divided for illustrative purposes. However, the operations performed by the various components may be combined or performed in any other component. For example, in the illustrative example, the functions of a tracker component as described above may be performed by the planner component 1224. However, in other examples, the tracker component may include a separate component independent of the planner component 1224.

In some instances, aspects of some or all of the components discussed herein may include any models, techniques, and/or machine learning techniques. For example, in some instances, the components in the memory 1218 (and the memory 1232, discussed below) may be implemented as a neural network.

In at least one example, the sensor system(s) 1206 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1206 may include multiple instances of each of these or other types of sensors. For instance, the lidar sensors may include individual lidar sensors located at the corners, front, back, sides, and/or top of the vehicle 1202. As another example, the camera sensors may include multiple cameras disposed at various locations about the exterior and/or interior of the vehicle 1202. The sensor system(s) 1206 may provide input to the vehicle computing device(s) 1204. Additionally, or alternatively, the sensor system(s) 1206 may send sensor data, via the one or more networks 1236, to the one or more computing device(s) 1234 at a particular frequency, after a lapse of a predetermined period of time, in near real-time, etc.

The vehicle 1202 may also include one or more emitters 1208 for emitting light and/or sound, as described above. The emitters 1208 in this example include interior audio and visual emitters to communicate with passengers of the vehicle 1202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1202 may also include one or more communication connection(s) 1210 that enable communication between the vehicle 1202 and one or more other local or remote computing device(s). For instance, the communication connection(s) 1210 may facilitate communication with other local computing device(s) on the vehicle 1202 and/or the drive system(s) 1214. Also, the communication connection(s) 1210 may allow the vehicle to communicate with other nearby computing device(s) (e.g., computing device(s) 1234, other nearby vehicles, etc.) and/or one or more remote sensor system(s) for receiving sensor data.

The communications connection(s) 1210 may include physical and/or logical interfaces for connecting the vehicle computing device 1204 to another computing device or a network, such as network(s) 1236. For example, the communications connection(s) 1210 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 1202 may include one or more drive systems 1214. In some examples, the vehicle 1202 may have a single drive system 1214. In at least one example, if the vehicle 1202 has multiple drive systems 1214, individual drive systems 1214 may be positioned on opposite ends of the vehicle 1202 (e.g., the front and the rear, etc.). In at least one example, the drive system(s) 1214 may include one or more sensor systems to detect conditions of the drive system(s) 1214 and/or the surroundings of the vehicle 1202. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration associated with the drive systems, cameras or other image sensors, ultrasonic sensors to acoustically detect objects in the surroundings of the drive system, lidar sensors, radar sensors, etc. Some sensors, such as the wheel encoders may be unique to the drive system(s) 1214. In some cases, the sensor system(s) on the drive system(s) 1214 may overlap or supplement corresponding systems of the vehicle 1202 (e.g., sensor system(s) 1206).

The drive system(s) 1214 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1214 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 1214. Furthermore, the drive system(s) 1214 may also include one or more communication connection(s) that enable communication by the respective drive system with one or more other local or remote computing device(s).

In at least one example, the direct connection 1212 may provide a physical interface to couple the one or more drive system(s) 1214 with the body of the vehicle 1202. For example, the direct connection 1212 may allow the transfer of energy, fluids, air, data, etc. between the drive system(s) 1214 and the vehicle 1202. In some instances, the direct connection 1212 may further releasably secure the drive system(s) 1214 to the body of the vehicle 1202.

In at least one example, the localization component 1220, the perception component 1222, the planner component 1224, and/or the one or more system controllers 1226, and/or various components thereof, may process sensor data, as described above, and may send their respective outputs as log data 1230, over the one or more network(s) 1236, to the computing device(s) 1234. In at least one example, the vehicle computing device(s) 1204 may send the log data 1230 to the computing device(s) 1234 at a particular frequency, after a lapse of a predetermined period of time, in near real-time, etc.

In some examples, the vehicle 1202 may send sensor data to the computing device(s) 1234 via the network(s) 1236. In some examples, the vehicle 1202 may receive sensor data from the computing device(s) 1234 via the network(s) 1236. The sensor data may include raw sensor data and/or processed sensor data and/or representations of sensor data. In some examples, the sensor data (raw or processed) may be sent and/or received as one or more log files.

The computing device(s) 1234 may include processor(s) 1238 and a memory 1232 storing an object feature component 1240, an environment feature component 1242, a distribution component 1244, a sampling component 1246, and/or a modeling component 1248.

The object feature component 1240 may be configured to determine a feature associated with an object in an environment based on sensor data representing the environment. In some examples, object feature component 1240 may be configured to determine data representing a state of the object in the environment. In some examples, the state may include, but is not limited to, a pose of the object, a position of the object, an acceleration of the object, a speed of the object, a size of the object, a type of the object, a lighting state of the object, and the like. Additionally, or alternatively, the object feature component 1240 may be configured to determine the feature associated with the object by processing the data representing the state of the object with a machine learned (ML) model. For example, the data representing the state of the object may be input into the ML model and processed to determine output data including the feature associated with the object. In some examples, the ML model may be configured as a recurrent neural network (RNN). In some examples, the output data may be configured as multi-dimensional data and may include any number of channels corresponding to the number of features associated with the object. For example, the feature may be configured as a feature vector including vectorized object elements encoded as a feature vector.

The environment feature component 1242 may be configured to determine a feature associated with an environment corresponding to a position of an object in the environment. In some examples, environment feature component 1242 may be configured to determine data representing a view of the environment. In some examples, the data may be represented in a plan view or top-down view. In other instances, the data may be represented in an elevation view or a side view. The data representing the view of the environment may be determined using sensor data representing the environment and/or map data associated with the environment and received from a map data server. In some examples, the view of the environment may represent various elements within the environment, including but not limited to roads, lanes, curbs, shoulders, crosswalks, buildings, trees, medians, street signs, traffic signals, speed limits, etc. Additionally, or alternatively, the environment feature component 1242 may determine the feature associated with the environment by processing the data representing the view of the environment with an ML model. For example, the data representing the view of the environment may be input into an ML model and processed to determine output data including a feature associated with the environment. The ML model may be configured as an RNN or a convolution neural network (CNN). In some examples, the output data may be configured as multi-dimensional data and may include any number of channels corresponding to the number of features associated with the environment at the position of the object in the environment. For example, the feature may be configured as a feature vector including vectorized environment elements encoded as a feature vector.

The distribution component 1244 may be configured to decode nodes and/or edge features connecting the nodes of the GNN to determine a distribution of predicted positions for an object at a future time horizon in the environment. Additionally, or alternatively, the distribution component 1244 may be configured to evaluate the distribution of predicted positions to determine a subset of the predicted positions that meet a criterion, allowing for more efficient sampling of the predicted positions (e.g., removing impossible real-world scenarios, influencing an object to behave in a specific manner, etc.). In some examples, the criterion may be based on a type of an object, a characteristic of an object, map data, input data, or the like.

The sampling component 1246 may be configured to use various sampling techniques to sample a distribution of predicted positions and determine a predicted position of an object in an environment at a future time horizon. The various sampling techniques may include, but are not limited to, gaussian sampling (e.g., following a sampling pattern based on a gaussian distribution), most likely sampling (e.g., taking an average, such as the min, max, or mean of the distribution), or overwrite sampling (e.g., selecting a specific position for an object that may or may not be included in the distribution). The sampling component 1246 may be configured to determine a sampling technique based on a classification type of a graph node (e.g., is the graph node associated with the autonomous vehicle, an object, a specific type of object, etc.), the predicted positions of the predicted position distribution (e.g., whether the predicted positions are in a predefined area), a distribution type of the predicted position distribution, an input associated with the predicted position distribution (e.g., a reference trajectory associated with an object), or the like. The sampling component 1246 may be configured to employ a different sampling technique for sampling distributions for two different objects at the same time horizon and/or for sampling distributions for a single object at a different time horizon.

The modeling component 1248 may be configured to determine a graph structure and/or a graph neural network (GNN) including nodes representing objects in an environment and edges connecting the nodes. In some examples, the modeling component may be configured to update and/or perform instance operations the GNN. Additionally, or alternatively, the modeling component 1248 may be configured to encode features associated with the object and/or features associated with the environment at a position of the object in the environment into a node of the GNN. Additionally, or alternatively, the modeling component 1248 may be configured to encode relative features of objects in the edges of the GNN.

In various examples, the computing device(s) 1234 may include one or more input/output (I/O) devices, such as via one or more interfaces 1250. The interface(s) 1250 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view a user interface associated with the sampling component 1246, such as to input data and/or view results via one or more interface(s) 1250. In such examples, the interface(s) 1250 may include one or more displays. Depending on the type of computing device, such as a user computing device, server computing device, or the like, the display may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphical user interface presented on the display. Accordingly, examples herein are not limited to any particular display technology.

The processor(s) 1216 of the vehicle 1202 and the processor(s) 1238 of the computing device(s) 1234 may be any suitable processor capable of executing instructions to process data and perform operations as described herein. By way of example and not limitation, the processor(s) 1216 and 1238 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 1218 and 1232 are examples of non-transitory computer-readable media. The memory 1218 and 1232 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 1218 and 1232 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naive Bayes, Gaussian naive Bayes, multinomial naive Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

EXAMPLE CLAUSES

A. A system comprising: one or more processors; and one or more non-transitory computer-readable media storing computer-executable instructions that, when executed by the one or more processors, cause the one or more processors to perform operations comprising: receiving sensor data from a sensor associated with a vehicle in an environment, the environment including a first object; determining, based at least in part on the sensor data, first data representing a first state of the first object at a first time; receiving, based at least in part on inputting the first data into a first machine learned (ML) model, second data from the first ML model, the second data including a first feature associated with the first object; determining, based at least in part on map data associated with the environment, third data representing a top-down view of the environment; receiving, based at least in part on inputting the third data into a second ML model, fourth data from the second ML model, the fourth data including a second feature associated with the environment; associating, the second data and the fourth data with a first node of a Graph Neural Network (GNN) representing the first object; determining a second node of the GNN representing the vehicle; determining a first edge connecting the first node and the second node, wherein the first state of the first object is represented relative to a second state of the vehicle; performing a first inference operation on the GNN; determining, based at least in part on the first inference operation, a first output representing a first predicted position of the first object at a second time after the first time; and determining, based at least in part on the first predicted position of the first object, a first trajectory for the first object.

B. The system of paragraph A, wherein the vehicle is an autonomous vehicle traversing the environment, and the operations further comprise controlling the autonomous vehicle based at least in part on the first trajectory for the first object.

C. The system of paragraph A or B, the operations further comprising: determining, based at least in part on the sensor data, fifth data representing a third state of a second object in the environment; receiving, based at least in part on inputting the fifth data into the second ML model, sixth data including a third feature associated with the second object; associating the fourth data and the sixth data with a third node of the GNN representing the second object; determining a second edge connecting the first node and the third node, wherein the third state of the second object is represented relative to the first state of the first object; determining a third edge connecting the second node and the third node, wherein the third state of the second object is represented relative to the second state of the vehicle; performing a second inference operation on the GNN; determining, based at least in part on the second inference operation, a second output representing a second predicted position of the second object at the second time; and determining, based at least in part on the first predicted position of the first object and the second predicted position of the second object, the first trajectory for the first object and a second trajectory for the second object.

D. The system of any one of paragraphs A-C, the operations further comprising: updating the first node of the GNN representing the first object based at least in part on the fourth data and the first predicted position of the first object, wherein the first predicted position of the first object is represented relative to the second state of the vehicle; performing a second inference operation on the GNN; determining, based at least in part on the second inference operation, a second output representing a second predicted position of the first object at a third time that is subsequent to the second time; and wherein determining the first trajectory for the first object is based at least in part on the first predicted position of the first object and the second predicted position of the first object.

E. The system of any one of paragraphs A-D, wherein the first data includes a third state of a second object in the environment, and the operations further comprising determining, based at least in part on the GNN, a second predicted position of the second object, wherein determining the first trajectory for the first object is based at least in part on the first predicted position of the first object and the second predicted position of the second object.

F. A method comprising: receiving sensor data from a sensor associated with a vehicle in an environment, the environment including an object; determining, based at least in part on the sensor data, a first feature associated with the object at a first time; determining, based at least in part on the sensor data or map data associated with the environment, a second feature associated with the environment; determining a first node of a Graph Neural Network (GNN) representing the first feature associated with the object and the second feature associated with the environment; determining a second node of the GNN representing the vehicle, wherein an edge connecting the first node and the second node represents a state of at least one of the vehicle or the object as a relative state; determining, based at least in part on the GNN, a first output representing a first predicted position of the object at a second time after the first time; and determining, based at least in part on the first predicted position of the object, a first predicted trajectory for the object.

G. The method of paragraph F, wherein the vehicle is an autonomous vehicle traversing the environment, and the method further comprises controlling the autonomous vehicle based at least in part on the trajectory for the object.

H. The method of paragraph F or G, further comprising: determining, based at least in part on the GNN, a second output representing a second predicted position of the vehicle at the second time; receiving, from a planning component associated with the vehicle, a reference trajectory for the vehicle through the environment; updating the second node of the GNN based at least in part on the reference trajectory, wherein the edge connecting the first node and the second node represents a candidate position of the vehicle; and determining, based at least in part on the first predicted position of the object and the candidate position of the vehicle, the first predicted trajectory of the object.

I. The method of any one of paragraphs F-H, wherein the edge connecting the first node and the second node represents the state of the object relative to the vehicle at the first time, and the method further comprising: determining, based at least in part on the map data, a feature map associated with the environment; determining, based at least in part on the first predicted position of the object in the environment and on the feature map, a third feature associated with the environment; updating the first node of the GNN based at least in part on the third feature; determining, based at least in part on the GNN, a second output representing a second predicted position of the object at a third time after the second time; and wherein determining the first predicted trajectory for the object is based at least in part on the first predicted position of the object and the second predicted position of the object.

J. The method of any one of paragraphs F-I, further comprising determining the first feature associated with the object based at least in part on data representing at least one of: a pose of the object; a position of the object; an acceleration of the object; a speed of the object; a size of the object; a type of the object; or a lighting state of the object.

K. The method of paragraph J, further comprising determining the first feature associated with the object based at least in part on inputting the data into a Recurrent Neural Network (RNN).

L. The method of any one of paragraphs F-K, further comprising determining the second feature associated with the environment based at least in part on data representing at least one of: a static object in the environment; a dynamic object in the environment; a traffic sign in the environment; a traffic light in the environment; a type of the static object or the dynamic object in the environment; a lighting state of the static object or the dynamic object in the environment; or a lane marking in the environment.

M. The method of any one of paragraphs F-L, wherein: the first feature is determined based at least in part on inputting data associated with the object into a first neural network, wherein the data is based at least in part on the sensor data; the second feature is determined based at least in part on inputting a view of the environment into a second neural network that is different from the first neural network, wherein the view of the environment is based at least in part on the sensor data; and the second feature is associated with a portion of the environment corresponding to the object.

N. One or more non-transitory computer-readable media storing instructions executable by one or more processors, wherein the instructions, when executed, cause the one or more processors to perform operations comprising: receiving sensor data from a sensor associated with a vehicle in an environment, the environment including an object; determining, based at least in part on the sensor data, a first feature associated with the object at a first time; determining, based at least in part on the sensor data or map data associated with the environment, a second feature associated with the environment; determining a first node of a Graph Neural Network (GNN) representing the first feature associated with the object and the second feature associated with the environment; determining a second node of the GNN representing the vehicle, wherein an edge connecting the first node and the second node represents a state of at least one of the vehicle or the object as a relative state; determining, based at least in part on the GNN, a first output representing a first predicted position of the object at a second time after the first time; and determining, based at least in part on the first predicted position of the object, a first predicted trajectory for the object.

O. The one or more non-transitory computer-readable media of paragraph N, wherein the vehicle is an autonomous vehicle traversing the environment, and the operations further comprising controlling the autonomous vehicle based at least in part on the trajectory for the object.

P. The one or more non-transitory computer-readable media of paragraphs N or O, the operations further comprising: determining, based at least in part on the GNN, a second output representing a second predicted position of the vehicle at the second time; receiving, from a planning component associated with the vehicle, a reference trajectory for the vehicle through the environment; updating the second node of the GNN based at least in part on the reference trajectory, wherein the edge connecting the first node and the second node represents a candidate position of the vehicle; and determining, based at least in part on the first predicted position of the object and the candidate position of the vehicle, the first predicted trajectory of the object.

Q. The one or more non-transitory computer-readable media of any one of paragraphs N-P, wherein the edge connecting the first node and the second node represents the state of the object relative to the vehicle at the first time, and the operations further comprising: determining, based at least in part on the map data, a feature map associated with the environment; determining, based at least in part on the first predicted position of the object in the environment and on the feature map, a third feature associated with the environment; updating the first node of the GNN based at least in part on the third feature; determining, based at least in part on the GNN, a second output representing a second predicted position of the object at a third time after the second time; and wherein determining the first predicted trajectory for the object is based at least in part on the first predicted position of the object and the second predicted position of the object.

R. The one or more non-transitory computer-readable media of paragraphs N-Q, the operations further comprising determining the first feature associated with the object based at least in part on data representing at least one of: a pose of the object; a position of the object; an acceleration of the object; a speed of the object; a size of the object; a type of the object; or a lighting state of the object.

S. The one or more non-transitory computer-readable media of any one of paragraphs N-R, the operations further comprising determining the second feature associated with the environment based at least in part on data representing at least one of: a static object in the environment; a dynamic object in the environment; a traffic sign in the environment; a traffic light in the environment; a type of the static object or the dynamic object in the environment; a lighting state of the static object or the dynamic object in the environment; or a lane marking in the environment.

T. The one or more non-transitory computer-readable media of paragraph S, the operations further comprising determining the second feature associated with the environment based at least in part on inputting the data into a Convolutional Neural Network (CNN).

U. A system comprising: one or more processors; and one or more non-transitory computer-readable media storing computer-executable instructions that, when executed by the one or more processors, cause the one or more processors to perform operations comprising: receiving sensor data from a sensor associated with a vehicle in an environment, the environment including an object; determining, based at least in part on the sensor data, a first feature associated with the object at a first time; determining, based at least in part on map data associated with the environment, a feature map representing an area associated with the environment; determining, based at least in part on a current position of the object in the environment and on the feature map, a second feature associated with the environment at the first time; determining a node of a Graph Neural Network (GNN) representing the first feature and the second feature; determining, based at least in part on the GNN, a first output representing a first predicted position of the object that is outside the area of the environment; determining, based at least in part on the first predicted position being outside the area and on the map data, a second predicted position of the object; and controlling the vehicle based at least in part on the second predicted position.

V. The system of paragraph U, wherein the first output further includes first distribution data for the object, the first distribution data including first predicted positions for the object, and the operations further comprising determining the first predicted position based at least in part on sampling from the first distribution data.

W. The system of paragraphs U or V, the operations further comprising determining, based at least in part on the current position of the object in the environment and the map data, a reference line, wherein determining the second predicted position of the object is based at least in part on projecting the first predicted position onto the reference line.

X. The system of any one of paragraphs U-W, the operations further comprising: determining that the second predicted position of the object in the environment is outside of the area associated with the feature map; determining, based at least in part on the second predicted position of the object being outside of the area, a third feature associated with the environment, wherein the third feature is a null feature; updating the node of the GNN based at least in part on the third feature; determining, based at least in part on the GNN, a second output representing a third predicted position of the object that is outside of the area of the environment; determining, based at least in part on the third predicted position and the map data, a fourth predicted position of the object; and controlling the vehicle based at least in part on the second predicted position of the object and the fourth predicted position of the object.

Y. The system of any one of paragraphs U-X, wherein a first distance between the current position of the object in the environment and the first predicted position of the object is the same as a second distance between the current position of the object in the environment and the second predicted position of the object.

Z. A method comprising: receiving sensor data from a sensor associated with a vehicle in an environment, the environment including an object; determining, based at least in part on the sensor data, a first feature associated with the object; determining, based at least in part on map data associated with the environment, a feature map representing an area of the environment; determining, based at least in part on a current position of the object and the feature map, a second feature associated with the environment; associating the first feature and the second feature with a node of a graph structure; determining, based at least in part on the graph structure, a first output representing a first predicted position of the object that is outside of the area of the environment; and determining, based at least in part on the first predicted position of the object and the map data, a second predicted position of the object.

AA. The method of paragraph Z, wherein the first output further includes first distribution data for the object, the first distribution data including first predicted positions for the object, and the method further comprising: determining the first predicted position of the object based at least in part on sampling from the first distribution data.

AB. The method of paragraphs Z or AA, further comprising determining, based at least in part on the current position of the object in the environment and the map data, a reference line, wherein determining the second predicted position of the object is based at least in part on projecting the first predicted position onto the reference line.

AC. The method of any one of paragraphs Z-AB, further comprising: determining that the second predicted position of the object in the environment is outside of the area associated with the feature map; determining, based at least in part on the second predicted position of the object being outside of the area, a third feature associated with the environment, wherein the third feature is a null feature; updating the node of the graph structure based at least in part on the third feature; determining, based at least in part on the graph structure, a second output representing a third predicted position of the object that is outside of the area of the environment; determining, based at least in part on the third predicted position and the map data, a fourth predicted position of the object; and controlling the vehicle based at least in part on the second predicted position of the object and the fourth predicted position of the object.

AD. The method of any one of paragraphs Z-AC, wherein a first distance between the current position of the object in the environment and the first predicted position of the object is the same as a second distance between the current position of the object in the environment and the second predicted position of the object.

AE. The method of any one of paragraphs Z-AD, wherein determining the second predicted position of the object is based at least in part on a vehicle dynamics model.

AF. The method of any one of paragraphs Z-AE, wherein the area is a bounded area, and a portion of the feature map corresponding to the bounded area is used for planning a trajectory of a vehicle through the environment.

AG. The method of any one of paragraphs Z-AF, wherein: the first feature is determined based at least in part on inputting a portion of the sensor data associated with the object into a first neural network; the feature map is determined based at least in part on inputting a view of the environment into a second neural network that is different from the first neural network, wherein the view of the environment is based at least in part on the sensor data; and the second feature is associated with a portion of the area of the environment corresponding to the object.

AH. One or more non-transitory computer-readable media storing instructions executable by one or more processors, wherein the instructions, when executed, cause the one or more processors to perform operations comprising: receiving sensor data from a sensor associated with a vehicle in an environment, the environment including an object; determining, based at least in part on the sensor data, a first feature associated with the object; determining, based at least in part on map data associated with the environment, a feature map representing an area of the environment; determining, based at least in part on a current position of the object and the feature map, a second feature associated with the environment; associating the first feature and the second feature with a node of a graph structure; determining, based at least in part on the graph structure, a first output representing a first predicted position of the object that is outside of the area of the environment; and determining, based at least in part on the first predicted position of the object and the map data, a second predicted position of the object.

AI. The one or more non-transitory computer-readable media of paragraph AH, wherein the first output further includes first distribution data for the object, the first distribution data including first predicted positions for the object, and the operations further comprising: determining the first predicted position of the object based at least in part on sampling from the first distribution data.

AJ. The one or more non-transitory computer-readable media of paragraphs AH or AI, the operations further comprising determining, based at least in part on the current position of the object in the environment and the map data, a reference line, wherein determining the second predicted position of the object is based at least in part on projecting the first predicted position onto the reference line.

AK. The one or more non-transitory computer-readable media of any one of paragraphs AH-AJ, the operations further comprising: determining that the second predicted position of the object in the environment is outside of the area associated with the feature map; determining, based at least in part on the second predicted position of the object being outside of the area, a third feature associated with the environment, wherein the third feature is a null feature; updating the node of the graph structure based at least in part on the third feature; determining, based at least in part on the graph structure, a second output representing a third predicted position of the object that is outside of the area of the environment; determining, based at least in part on the third predicted position and the map data, a fourth predicted position of the object; and controlling the vehicle based at least in part on the second predicted position of the object and the fourth predicted position of the object.

AL. The one or more non-transitory computer-readable media of any one of paragraphs AH-AK, wherein a first distance between the current position of the object in the environment and the first predicted position of the object is the same as a second distance between the current position of the object in the environment and the second predicted position of the object.

AM. The one or more non-transitory computer-readable media of any one of paragraphs AH-AL, wherein determining the second predicted position of the object is based at least in part on a vehicle dynamics model.

AN. The one or more non-transitory computer-readable media of any one of paragraphs AH-AM, wherein the area is a bounded area, and a portion of the feature map corresponding to the bounded area is used for planning a trajectory of a vehicle through the environment.

AO. A system comprising: one or more processors; and one or more non-transitory computer-readable media storing computer-executable instructions that, when executed by the one or more processors, cause the one or more processors to perform operations comprising: receiving sensor data from a sensor associated with a vehicle in an environment, the environment including an object; determining, based at least in part on the sensor data, a first feature associated with one of the object or the vehicle; determining, based at least in part on map data associated with the environment, a second feature associated with the environment; determining, based on the first feature and the second feature, a graph node of a Graph Neural Network (GNN); determining, based at least in part on inferencing the GNN, first output representing distribution data associated with the node, the distribution data including predicted positions for the object or the vehicle in the environment; determining a sampling technique for sampling the distribution data based at least in part on at least one of a classification type of the graph node, the predicted positions of the distribution data, a distribution type of the distribution data, or an input associated with the distribution data; determining a first predicted position of the object or the vehicle based at least in part on the sampling technique; and controlling the vehicle based at least in part on the first predicted position.

AP. The system of paragraph AO, the operations further comprising one of: determining that the classification type of the graph node indicates that the graph node is associated with the object, wherein the sampling technique comprises a first sampling technique; or determining that the classification type of the graph node indicates that the graph node is associated with the vehicle, wherein the sampling technique comprises a second sampling technique that is different from the first sampling technique.

AQ. The system of paragraphs AO or AP, the operations further comprising: determining a bounded area of the environment used for planning a trajectory of the vehicle; determining, based at least in part on the distribution data, that the predicted positions of the distribution data are outside of the bounded area; determining the sampling technique based at least in part on the predicted positions of the distribution data being outside of the bounded area; and determining, based at least in part on the sampling technique and map data associated with the environment, the first predicted position of the object.

AR. The system of any one of paragraphs AO-AQ, the operations further comprising one of: first operations comprising: determining that the distribution type of the distribution data is a first distribution type; and determining, based at least in part on sampling the distribution data using the sampling technique, the first predicted position of the object or the vehicle, wherein the sampling technique comprises a Gaussian sampling technique; or second operations comprising: determining that the distribution type of the distribution data is a second distribution type; and determining, based at least in part on sampling the distribution data using the sampling technique, the first predicted position of the object or the vehicle, wherein the first predicted position is an average of the predicted positions of the distribution data.

AS. The system of any one of paragraphs AO-AR, wherein the vehicle is an autonomous vehicle and the operations further comprising receiving, from a planning component of the autonomous vehicle, the input, wherein the first predicted position of the object or the vehicle is based at least in part on the input data.

AT. A method comprising: receiving sensor data from a sensor associated with a vehicle in an environment, the environment including an object; associating a first feature associated with one of the object or the vehicle and a second feature associated with the environment with a node of a graph structure; determining, based at least in part on the graph structure, first output representing distribution data associated with the node, the distribution data including predicted positions for the object or the vehicle in the environment; determining a sampling technique for sampling the distribution data based at least in part on at least one of a classification type of the node, the predicted positions of the distribution data, a distribution type of the distribution data, or an input associated with the distribution data; determining a first predicted position of the object or the vehicle based at least in part on the sampling technique; and determining a predicted trajectory for the object or the vehicle based at least in part on the first predicted position.

AU. The method of paragraph AT, further comprising one of: determining that the classification type of the node indicates that the node is associated with the object, wherein the sampling technique comprises a first sampling technique; or determining that the classification type of the node indicates that the node is associated with the vehicle, wherein the sampling technique comprises a second sampling technique that is different from the first sampling technique.

AV. The method of paragraphs AT or AU, further comprising: determining a bounded area of the environment used for planning a trajectory of the vehicle; determining, based at least in part on the distribution data, that the predicted positions of the distribution data are outside of the bounded area; determining the sampling technique based at least in part on the predicted positions of the distribution data being outside of the bounded area; and determining, based at least in part on the sampling technique and map data associated with the environment, the first predicted position of the object.

AW. The method of any one of paragraphs AT-AV, further comprising one of: first operations comprising: determining that the distribution type of the distribution data is a first distribution type; and determining, based at least in part on sampling the distribution data using the sampling technique, the first predicted position of the object or the vehicle, wherein the sampling technique comprises a Gaussian sampling technique; or second operations comprising: determining that the distribution type of the distribution data is a second distribution type; and determining, based at least in part on sampling the distribution data using the sampling technique, the first predicted position of the object or the vehicle, wherein the first predicted position is an average of the predicted positions of the distribution data.

AX. The method of any one of paragraphs AT-AW, wherein the vehicle is an autonomous vehicle and the method further comprising receiving, from a planning component of the autonomous vehicle, the input, wherein the first predicted position of the object or the vehicle is based at least in part on the input data.

AY. The method of any one of paragraphs AT-AX, further comprising: receiving the input, wherein the input data indicates a candidate position for the object or the vehicle in the environment that is different from the predicted position; and determining the predicted trajectory for the object or the vehicle based on the selected position.

AZ. The method of any one of paragraphs AT-AY, wherein the sampling technique is a first sampling technique and the first predicted position is associated with a first time, and the method further comprising: updating, based at least in part on the first predicted position of the object or the vehicle, the node with a third feature associated with the environment; determining, based at least in part on the graph structure, second output representing the distribution data associated with the node, the distribution data including predicted positions for the object or the vehicle in the environment at a second time that is after the first time; determining a second sampling technique for sampling the distribution data, wherein the second sampling technique is different from the first sampling technique; determining a second predicted position of the object or the vehicle in the environment at the second time based at least in part on the second sampling technique; and determining the predicted trajectory based at least in part on the first predicted position and the second predicted position.

BA. The method of any one of paragraphs AT-AZ, wherein the object is a first object, the node is a first node associated with the first object, the distribution data is first distribution data associated with the first node at a first time, and the sampling technique is a first sampling technique, and the method further comprising: associating a third feature associated with the vehicle or a second object in the environment and the second feature associated with the environment with a second node of the graph structure; determining, based at least in part on the graph structure, second output representing second distribution data associated with the second node, the second distribution data include second predicted positions for the vehicle or the second object in the environment at the first time; determining the first sampling technique for sampling the first distribution data based at least in part on the classification type of the first node; determining a second sampling technique for sampling the second distribution data based at least in part on a first classification type of the second node, wherein the second sampling technique is different from the first sampling technique; determining a second predicted position of the vehicle or the second object at the first time based at least in part on the second sampling technique; and determining the predicted trajectory for the first object or the vehicle based at least in part on the first predicted position or the second predicted position.

BB. One or more non-transitory computer-readable media storing instructions executable by one or more processors, wherein the instructions, when executed, cause the one or more processors to perform operations comprising: receiving sensor data from a sensor associated with a vehicle in an environment, the environment including an object; associating a first feature associated with one of the object or the vehicle and a second feature associated with the environment with a node of a graph structure; determining, based at least in part on the graph structure, first output representing distribution data associated with the node, the distribution data including predicted positions for the object or the vehicle in the environment; determining a sampling technique for sampling the distribution data based at least in part on at least one of a classification type of the node, the predicted positions of the distribution data, a distribution type of the distribution data, or an input associated with the distribution data; determining a first predicted position of the object or the vehicle based at least in part on the sampling technique; and determining a predicted trajectory for the object or the vehicle based at least in part on the first predicted position.

BC. The one or more non-transitory computer-readable media of paragraph BB, the operations further comprising one of: determining that the classification type of the node indicates that the node is associated with the object, wherein the sampling technique comprises a first sampling technique; or determining that the classification type of the node indicates that the node is associated with the vehicle, wherein the sampling technique comprises a second sampling technique that is different from the first sampling technique.

BD. The one or more non-transitory computer-readable media of paragraphs BB or BC, the operations further comprising: determining a bounded area of the environment used for planning a trajectory of the vehicle; determining, based at least in part on the distribution data, that the predicted positions of the distribution data are outside of the bounded area; determining the sampling technique based at least in part on the predicted positions of the distribution data being outside of the bounded area; and determining, based at least in part on the sampling technique and map data associated with the environment, the first predicted position of the object.

BE. The one or more non-transitory computer-readable media of any one of paragraphs BB-BD, the operations further comprising one of: first operations comprising: determining that the distribution type of the distribution data is a first distribution type; and determining, based at least in part on sampling the distribution data using the sampling technique, the first predicted position of the object or the vehicle, wherein the sampling technique comprises a Gaussian sampling technique; or second operations comprising: determining that the distribution type of the distribution data is a second distribution type; and determining, based at least in part on sampling the distribution data using the sampling technique, the first predicted position of the object or the vehicle, wherein the first predicted position is an average of the predicted positions of the distribution data.

BF. The one or more non-transitory computer-readable media of any one of paragraphs BB-BE, wherein the vehicle is an autonomous vehicle and the operations further comprising receiving, from a planning component of the autonomous vehicle, the input, wherein the first predicted position of the object or the vehicle is based at least in part on the input data.

BG. The one or more non-transitory computer-readable media of any one of paragraphs BB-BF, the operations further comprising: receiving the input, wherein the input data indicates a candidate position for the object or the vehicle in the environment that is different from the predicted position; and determining the predicted trajectory for the object or the vehicle based on the selected position.

BH. The one or more non-transitory computer-readable media of any one of paragraphs BB-BG, wherein the sampling technique is a first sampling technique and the first predicted position is associated with a first time, and the operations further comprising: updating, based at least in part on the first predicted position of the object or the vehicle, the node with a third feature associated with the environment; determining, based at least in part on the graph structure, second output representing the distribution data associated with the node, the distribution data including predicted positions for the object or the vehicle in the environment at a second time that is after the first time; determining a second sampling technique for sampling the distribution data, wherein the second sampling technique is different from the first sampling technique; determining a second predicted position of the object or the vehicle in the environment at the second time based at least in part on the second sampling technique; and determining the predicted trajectory based at least in part on the first predicted position and the second predicted position.

BI. A system comprising: one or more processors; and one or more non-transitory computer-readable media storing computer-executable instructions that, when executed by the one or more processors, cause the one or more processors to perform operations comprising: receiving sensor data from a sensor associated with a vehicle in an environment at a first time, the environment including an object; determining, based at least in part on the sensor data, a first feature associated with the object; determining, based at least in part on map data associated with the environment, a second feature associated with the environment; associating, with a node of a Graph Neural Network (GNN), the first feature associated with the object and the second feature associated with the environment; determining, based at least in part on the GNN and a criterion, a first output representing first distribution data including predicted positions for the object that satisfy the criterion; determining, based at least in part on sampling from the first distribution data, a first predicted position of the object at a second time that is after the first time; and controlling the vehicle based on the first predicted position of the object.

BJ. The system of paragraph BI, wherein the sensor is associated with an autonomous vehicle traversing the environment, and the operations further comprising: receiving, from a planning component associated with the autonomous vehicle, a trajectory of the vehicle through the environment; and determining the criterion based at least in part on the trajectory of the autonomous vehicle.

BK. The system of paragraphs BI or BJ, the operations further comprising: determining, based at least in part on the first feature associated with the object and the second feature associated with the environment, an intent associated with the object; and determining the criterion based at least in part on the intent associated with the object.

BL. The system of any one of paragraphs BI-BK, the operations further comprising: receiving the map data associated with the environment; determining, based at least in part on the map data and the sensor data, a rule associated with the environment, wherein the rule includes at least one of: a traffic sign; a traffic light; a zone in the environment; or a speed limit; determining the criterion based at least in part on the rule associated with the environment.

BM. The system of any one of paragraphs BI-BL, wherein the criterion is based at least in part on the object characteristic associated with the object, the object characteristic including at least one of: a turning radius associated with the object; a maximum speed associated with the object; an acceleration limit associated with the object; a lane change maneuver associated with the object; a turn maneuver associated with the object; or an adverse behavior maneuver associated with the object.

BN. A method comprising: receiving sensor data from a sensor associated with a vehicle in an environment, the environment including an object at a first time; associating a first feature associated with the object and a second feature associated with the environment with a node of a graph structure; determining, based at least in part on the graph structure and a criterion, a first output representing first distribution data including predicted positions for the object that satisfy the criterion; determining, based at least in part on sampling from the first distribution data, a first predicted position of the object at a second time after the first time; and determining a first predicted trajectory for the object based at least in part on the first predicted position of the object.

BO. The method of paragraph BN, wherein the vehicle is an autonomous vehicle traversing the environment, and the method further comprising: receiving, from a planning component associated with the autonomous vehicle, a trajectory of the vehicle through the environment; and determining the criterion based at least in part on the trajectory of the autonomous vehicle.

BP. The method of paragraphs BN or BO, further comprising: determining, based at least in part on the first feature associated with the object and the second feature associated with the environment, an intent associated with the object; and determining the criterion based at least in part on the intent associated with the object.

BQ. The method of any one of paragraphs BN-BP, further comprising: receiving map data associated with the environment; determining, based at least in part on the map data and the sensor data, a rule associated with the environment, wherein the rule includes at least one of: a stop sign; a traffic light; a zone in the environment; or a speed limit; determining the criterion based at least in part on the rule associated with the environment.

BR. The method of any one of paragraphs BN-BQ, further comprising determining the criterion based at least in part on an object characteristic associated with the object, wherein the object characteristic includes at least one of: a turning radius associated with the object; a maximum speed associated with the object; an acceleration limit associated with the object; a lane change maneuver associated with the object; a turn maneuver associated with the object; or an adverse behavior maneuver associated with the object.

BS. The method of any one of paragraphs BN-BR, further comprising determining the criterion based at least in part on the first feature of the object, wherein the first feature includes at least one of: a current pose of the object; a current position of the object; a current acceleration of the object; a current speed of the object; a size of the object; a type of the object; or a lighting state of the object.

BT. The method of any one of paragraphs BN-BS, wherein the object is a first object and the criterion is a first criterion, and the method further comprising: determining, based at least in part on the sensor data, a third feature associated with a second object in the environment; associating the third feature associated with the second object and the second feature associated with the environment with a second node of the graph structure; determining a second criterion based at least in part on the first predicted position of the first object; determining, based at least in part on the graph structure and the second criterion, second output representing second distribution data for the second object, the second distribution data including second predicted positions for the second object that satisfy the second criterion; determining, based at least in part on sampling from the second distribution data, a second predicted position of the second object at the second time; and determining, based at least in part on the second predicted position of the second object and the first predicted trajectory of the first object, a second predicted trajectory of the second object.

BU. The method of paragraph BT, wherein the vehicle is an autonomous vehicle traversing the environment, and the method further comprising: determining, based at least in part on the first predicted trajectory of the first object and the second predicted trajectory of the second object, a third predicted trajectory for the autonomous vehicle; and controlling the autonomous vehicle based at least in part on the third predicted trajectory.

BV. One or more non-transitory computer-readable media storing instructions executable by one or more processors, wherein the instructions, when executed, cause the one or more processors to perform operations comprising: receiving sensor data from a sensor associated with a vehicle in an environment, the environment including an object at a first time; associating a first feature associated with the object and a second feature associated with the environment with a node of a graph structure; determining, based at least in part on the graph structure and a criterion, a first output representing first distribution data including predicted positions for the object that satisfy the criterion; determining, based at least in part on sampling from the first distribution data, a first predicted position of the object at a second time after the first time; and determining a first predicted trajectory for the object based at least in part on the first predicted position of the object.

BW. The one or more non-transitory computer-readable media of paragraph BV, wherein the vehicle is an autonomous vehicle traversing the environment, and the operations further comprising: receiving, from a planning component associated with the autonomous vehicle, a trajectory of the vehicle through the environment; and determining the criterion based at least in part on the trajectory of the autonomous vehicle.

BX. The one or more non-transitory computer-readable media of paragraphs BV or BW, the operations further comprising: determining, based at least in part on the first feature associated with the object and the second feature associated with the environment, an intent associated with the object; and determining the criterion based at least in part on the intent associated with the object.

BY. The one or more non-transitory computer-readable media of any one of paragraphs BV-BX, the operations further comprising: receiving map data associated with the environment; determining, based at least in part on the map data and the sensor data, a rule associated with the environment, wherein the rule includes at least one of: a stop sign; a traffic light; a zone in the environment; or a speed limit; determining the criterion based at least in part on the rule associated with the environment.

BZ. The one or more non-transitory computer-readable media of any one of paragraphs BV-BY, the operations further comprising determining the criterion based at least in part on an object characteristic associated with the object, wherein the object characteristic includes at least one of: a turning radius associated with the object; a maximum speed associated with the object; an acceleration limit associated with the object; a lane change maneuver associated with the object; a turn maneuver associated with the object; or an adverse behavior maneuver associated with the object.

CA. The one or more non-transitory computer-readable media of any one of paragraphs BV-BZ, the operations further comprising determining the criterion based at least in part on the first feature of the object, wherein the first feature includes at least one of: a current pose of the object; a current position of the object; a current acceleration of the object; a current speed of the object; a size of the object; a type of the object; or a lighting state of the object.

CB. The one or more non-transitory computer-readable media of any one of paragraphs BV-CA, wherein the object is a first object and the criterion is a first criterion, and the operations further comprising: determining, based at least in part on the sensor data, a third feature associated with a second object in the environment; associating the third feature associated with the second object and the second feature associated with the environment with a second node of the graph structure; determining a second criterion based at least in part on the first predicted position of the first object; determining, based at least in part on the graph structure and the second criterion, second output representing second distribution data for the second object, the second distribution data including second predicted positions for the second object that satisfy the second criterion; determining, based at least in part on sampling from the second distribution data, a second predicted position of the second object at the second time; and determining, based at least in part on the second predicted position of the second object and the first predicted trajectory of the first object, a second predicted trajectory of the second object.

While the example clauses described above are described with respect to one particular implementation, it should be understood that, in the context of this document, the content of the example clauses may also be implemented via a method, device, system, computer-readable medium, and/or another implementation. Additionally, any of examples A-CB may be implemented alone or in combination with any other one or more of the examples A-CB.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed by the one or more processors, cause the one or more processors to perform operations comprising:
receiving sensor data from a sensor associated with a vehicle in an environment at a first time, the environment including an object;
determining, based at least in part on the sensor data, a first feature associated with the object;
determining, based at least in part on map data associated with the environment, a second feature associated with the environment;
associating, with a node of a Graph Neural Network (GNN), the first feature associated with the object and the second feature associated with the environment;
determining, based at least in part on the GNN, a first output representing first distribution data comprising predicted positions for the object;
determining, based at least in part on a criterion, a subset of the first distribution data as a focused distribution;
determining, based at least in part on sampling from the focused distribution, a first predicted position of the object at a second time that is after the first time; and
controlling the vehicle based on the first predicted position of the object.

2. The system of claim 1, wherein the sensor is associated with an autonomous vehicle traversing the environment, and the operations further comprising:
receiving, from a planning component associated with the autonomous vehicle, a trajectory of the vehicle through the environment; and
determining the criterion based at least in part on the trajectory of the autonomous vehicle.

3. The system of claim 1, the operations further comprising:
  determining, based at least in part on the first feature associated with the object and the second feature associated with the environment, an intent associated with the object; and
  determining the criterion based at least in part on the intent associated with the object.

4. The system of claim 1, the operations further comprising:
  receiving the map data associated with the environment;
  determining, based at least in part on the map data and the sensor data, a rule associated with the environment, wherein the rule includes at least one of:
    a traffic sign;
    a traffic light;
    a zone in the environment; or
    a speed limit;
  determining the criterion based at least in part on the rule associated with the environment.

5. The system of claim 1, wherein the criterion is based at least in part on an object characteristic associated with the object, the object characteristic including at least one of:
  a turning radius associated with the object;
  a maximum speed associated with the object;
  an acceleration limit associated with the object;
  a lane change maneuver associated with the object;
  a turn maneuver associated with the object; or
  an adverse behavior maneuver associated with the object.

6. The system of claim 1, wherein the focused distribution comprises predicted positions that meet the criterion.

7. The system of claim 1, wherein the sampling from the first distribution data comprises sampling predicted positions for the object between separate timesteps.

8. The system of claim 1, the operations further comprising: determining, based at least in part on the first predicted position, a second predicted position of the object at a third time that is after the second time.

9. A method comprising:
  receiving sensor data from a sensor associated with a vehicle in an environment, the environment including an object at a first time;
  associating a first feature associated with the object and a second feature associated with the environment with a node of a graph structure;
  determining, based at least in part on the graph structure, a first output representing first distribution data comprising predicted positions for the object;
  determining, based at least in part on a criterion, a subset of the first distribution data as a focused distribution;
  determining, based at least in part on sampling from the focused distribution, a first predicted position of the object at a second time after the first time;
  determining a first predicted trajectory of the object based at least in part on the first predicted position of the object; and
  controlling the vehicle based on at least one of the first predicted position of the object or the first predicted trajectory of the object.

10. The method of claim 9, wherein the vehicle is an autonomous vehicle traversing the environment, and the method further comprising:
  receiving, from a planning component associated with the autonomous vehicle, a trajectory of the vehicle through the environment; and
  determining the criterion based at least in part on the trajectory of the autonomous vehicle.

11. The method of claim 9, further comprising:
  determining, based at least in part on the first feature associated with the object and the second feature associated with the environment, an intent associated with the object; and
  determining the criterion based at least in part on the intent associated with the object.

12. The method of claim 9, further comprising:
  receiving map data associated with the environment;
  determining, based at least in part on the map data and the sensor data, a rule associated with the environment, wherein the rule includes at least one of:
    a stop sign;
    a traffic light;
    a zone in the environment; or
    a speed limit;
  determining the criterion based at least in part on the rule associated with the environment.

13. The method of claim 9, further comprising determining the criterion based at least in part on an object characteristic associated with the object, wherein the object characteristic includes at least one of:
  a turning radius associated with the object;
  a maximum speed associated with the object;
  an acceleration limit associated with the object;
  a lane change maneuver associated with the object;
  a turn maneuver associated with the object; or
  an adverse behavior maneuver associated with the object.

14. The method of claim 9, wherein the object is a first object and the criterion is a first criterion, and the method further comprising:
  determining, based at least in part on the sensor data, a third feature associated with a second object in the environment;
  associating the third feature associated with the second object and the second feature associated with the environment with a second node of the graph structure;
  determining a second criterion based at least in part on the first predicted position of the first object;
  determining, based at least in part on the graph structure and the second criterion, second output representing second distribution data for the second object, the second distribution data including second predicted positions for the second object that satisfy the second criterion;
  determining, based at least in part on sampling from the second distribution data, a second predicted position of the second object at the second time; and
  determining, based at least in part on the second predicted position of the second object and the first predicted trajectory of the first object, a second predicted trajectory of the second object.

15. The method of claim 14, wherein the vehicle is an autonomous vehicle traversing the environment, and the method further comprising:
  determining, based at least in part on the first predicted trajectory of the first object and the second predicted trajectory of the second object, a third predicted trajectory for the autonomous vehicle; and
  controlling the autonomous vehicle based at least in part on the third predicted trajectory.

16. One or more non-transitory computer-readable media storing instructions executable by one or more processors, wherein the instructions, when executed, cause the one or more processors to perform operations comprising:

receiving sensor data from a sensor associated with a vehicle in an environment, the environment including an object at a first time;

associating a first feature associated with the object and a second feature associated with the environment with a node of a graph structure;

determining, based at least in part on the graph structure, a first output representing first distribution data comprising predicted positions for the object;

determining, based at least in part on a criterion, a subset of the first distribution data as a focused distribution;

determining, based at least in part on sampling from the focused distribution, a first predicted position of the object at a second time after the first time;

determining a first predicted trajectory of the object based at least in part on the first predicted position of the object; and controlling the vehicle based on at least one of the first predicted position of the object or the first predicted trajectory of the object.

17. The one or more non-transitory computer-readable media of claim 16, the operations further comprising:

determining, based at least in part on the first feature associated with the object and the second feature associated with the environment, an intent associated with the object; and determining the criterion based at least in part on the intent associated with the object.

18. The one or more non-transitory computer-readable media of claim 16, the operations further comprising determining the criterion based at least in part on an object characteristic associated with the object, wherein the object characteristic includes at least one of:

a turning radius associated with the object;
a maximum speed associated with the object;
an acceleration limit associated with the object;
a lane change maneuver associated with the object;
a turn maneuver associated with the object; or
an adverse behavior maneuver associated with the object.

19. The one or more non-transitory computer-readable media of claim 16, the operations further comprising determining the criterion based at least in part on the first feature of the object, wherein the first feature includes at least one of:

a current pose of the object;
a current position of the object;
a current acceleration of the object;
a current speed of the object;
a size of the object;
a type of the object; or
a lighting state of the object.

20. The one or more non-transitory computer-readable media of claim 16, wherein the object is a first object and the criterion is a first criterion, and the operations further comprising:

determining, based at least in part on the sensor data, a third feature associated with a second object in the environment;

associating the third feature associated with the second object and the second feature associated with the environment with a second node of the graph structure;

determining a second criterion based at least in part on the first predicted position of the first object;

determining, based at least in part on the graph structure and the second criterion, second output representing second distribution data for the second object, the second distribution data including second predicted positions for the second object that satisfy the second criterion;

determining, based at least in part on sampling from the second distribution data, a second predicted position of the second object at the second time; and determining, based at least in part on the second predicted position of the second object and the first predicted trajectory of the first object, a second predicted trajectory of the second object.

* * * * *